United States Patent
White

(10) Patent No.: US 7,191,144 B2
(45) Date of Patent: Mar. 13, 2007

(54) METHOD FOR ESTIMATING RESPONDENT RANK ORDER OF A SET STIMULI

(75) Inventor: W. Donald White, Durham, NC (US)

(73) Assignee: Mentor Marketing, LLC, Durham, NC (US)

( * ) Notice: Subject to any disclaimer, the term of this patent is extended or adjusted under 35 U.S.C. 154(b) by 321 days.

(21) Appl. No.: 10/941,680

(22) Filed: Sep. 15, 2004

(65) Prior Publication Data

US 2005/0060222 A1 Mar. 17, 2005

Related U.S. Application Data

(60) Provisional application No. 60/503,687, filed on Sep. 17, 2003.

(51) Int. Cl.
G06F 17/30 (2006.01)
(52) U.S. Cl. ..................................................... 705/10
(58) Field of Classification Search .................. 705/10
See application file for complete search history.

(56) References Cited

U.S. PATENT DOCUMENTS

| | | | |
|---|---|---|---|
| 5,041,972 A | | 8/1991 | Frost |
| 5,124,911 A | * | 6/1992 | Sack ........................... 705/10 |
| 5,436,830 A | | 7/1995 | Zaltman |
| 5,583,763 A | | 12/1996 | Atcheson et al. |
| 5,893,098 A | * | 4/1999 | Peters et al. ................ 707/10 |
| 6,012,051 A | | 1/2000 | Sammon, Jr. et al. |
| 6,093,026 A | | 7/2000 | Walker et al. |
| 6,236,990 B1 | * | 5/2001 | Geller et al. ................ 707/5 |
| 6,256,663 B1 | | 7/2001 | Davis |
| 6,370,513 B1 | | 4/2002 | Kolawa et al. |
| 6,477,504 B1 | | 11/2002 | Hamlin et al. |
| 6,513,014 B1 | | 1/2003 | Walker et al. |

(Continued)

FOREIGN PATENT DOCUMENTS

| | | | |
|---|---|---|---|
| JP | 2004110432 A | * | 4/2004 |
| KR | 2001045776 A | * | 6/2001 |

OTHER PUBLICATIONS

Sha Yang, Greg M Allenby, Geraldine Fennell; "Modeling variation in brand preference: The roles of objective environment and motivating conditions", Marketing Science. Linthicum: Winter 2002. vol. 21, Iss. 1; p.14*

(Continued)

*Primary Examiner*—Romain Jeanty
*Assistant Examiner*—Jonathan G Sterrett
(74) *Attorney, Agent, or Firm*—The Eclipse Group LLP; Kevin E. Flynn

(57) ABSTRACT

A computer implemented method to estimate a respondent's or a set of respondents' rank order with respect to a number of attribute options (i.e. alternative prices, features, benefits, ways of expressing benefits, brand names, slogans, logos, graphic treatments such as package design elements and any other stimuli that the researcher believes may influence the individual's opinion such as a statement, graphic or brief audio). The method can be used when the number of stimuli to be presented exceeds the number that can be presented at one time to a respondent, most typically, exceeding the number that can be legibly displayed on one computer screen for rank ordering by a respondent. The estimated rank order is highly accurate, especially for the highest ranked stimuli, but requires only a small fraction of the respondent input that would be needed to capture a complete rank order from that respondent. This abstract is provided as an aid for finding relevant disclosures and not as a limitation on the scope of the claims.

32 Claims, 26 Drawing Sheets

U.S. PATENT DOCUMENTS

| | | | |
|---|---|---|---|
| 6,721,737 B2 | 4/2004 | Iyengar et al. | |
| 6,826,541 B1 * | 11/2004 | Johnston et al. | 705/36 R |
| 6,895,405 B1 * | 5/2005 | Choi et al. | 707/101 |
| 2002/0004739 A1 | 1/2002 | Elmer et al. | |
| 2002/0052774 A1 | 5/2002 | Parker et al. | |
| 2002/0152110 A1 | 10/2002 | Stewart et al. | |
| 2003/0018517 A1 * | 1/2003 | Dull et al. | 705/10 |
| 2003/0088458 A1 | 5/2003 | Afeyan et al. | |
| 2003/0225786 A1 | 12/2003 | Hall et al. | |
| 2003/0236696 A1 | 12/2003 | Fabricant et al. | |
| 2004/0093261 A1 | 5/2004 | Jain et al. | |
| 2004/0143481 A1 | 7/2004 | Li | |
| 2004/0148210 A1 | 7/2004 | Barrett et al. | |
| 2004/0172267 A1 | 9/2004 | Patel et al. | |
| 2006/0026081 A1 * | 2/2006 | Keil et al. | 705/27 |

OTHER PUBLICATIONS

Moez Hababou, Jean-Marc Martel; "A multicriteria approach for selecting a portfolio manager", INFOR. Ottawa: Aug. 1998. vol. 36, Iss. 3; p. 161.*

Holcomb, Mary Collins; "Customer service measurement: A methodology for increasing customer value through utilization of the Taguchi Strategy", Journal of Business Logistics. Oak Brook: 1994. vol. 15, Iss. 1; p. 29.*

Gilbride et al. "*Modeling Response Endogeneity in Survey Data*" *Fisher College of Business, Ohio State University and Stern School of Business, New York University*, 49 pages, (Jun. 2004).

North et al., "*The Importance of Apparel Product Attributes for Female Buyers*" *Journal of Family Ecology and Consumer Sciences*, vol. 31, pp. 41-51 (2003).

Hartmann et al., "*Preference Measurement in Marketing Research Practice*" *University of Hamburg, Hamburg Germany*, pp. 1-6.

"*SurveyTracker Plus 3.0 Survey Software for Employee Satisfaction, Course Evaluation, Patient Satisfaction, and more*", 4 pages.

Web pages from www.SurveyPro.com printed Oct. 18, 2004, "*The Concept of Conjoint Analysis*", 8 pages, http://www.surveys.com/conjoint/paper1.html.

Toubia et al., "Fast Polyhedral Adaptive Conjoint Estimation", 45 pgs. (Feb. 26, 2002) http://mitsloan.mit.edu.vc.

* cited by examiner

SURVEY PROCESS

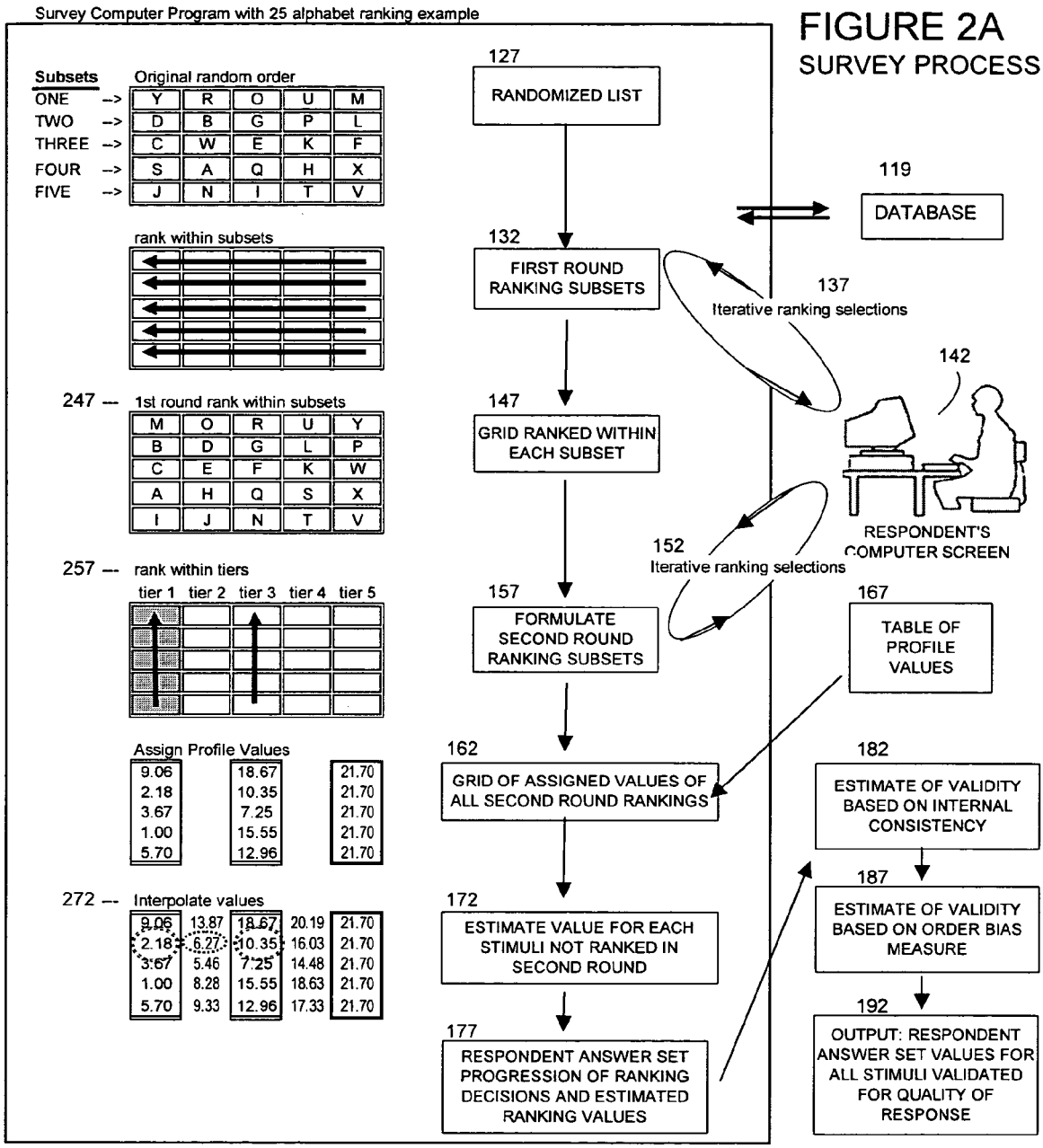

FIGURE 2B
SURVEY PROCESS

Survey Computer Program with 36 alphabet 9X4 ranking example

Subsets — Original random order

| | | | | | | | | |
|---|---|---|---|---|---|---|---|---|
| ONE → | AE | A | Q | AC | AA | F | T | Z | O |
| TWO → | AD | S | H | J | B | V | G | AI | U |
| THRE → | AJ | E | D | AF | AB | AH | AG | R | K |
| FOUR → | C | N | W | I | X | P | M | Y | L | rank within subsets

1st round rank within subsets

| A | F | O | Q | T | Z | AA | AC | AE |
|---|---|---|---|---|---|---|---|---|
| B | G | H | J | S | U | V | AD | AI |
| D | E | K | R | AB | AF | AG | AH | AJ |
| C | I | L | M | N | P | W | X | Y |

258 tier 1   tier 2   tier 3   tier 4   tier 5   tier 6   tier 7   tier 8   tier 9

Assign Profile Values

| 1.00 | 5.67 | | 12.98 | | 24.01 | | | 34.50 |
|---|---|---|---|---|---|---|---|---|
| 2.28 | 8.31 | | 9.29 | | 20.61 | | | 34.50 |
| 7.43 | 3.30 | | 16.43 | | 27.70 | | | 34.50 |
| 4.11 | 12.28 | | 16.36 | | 20.59 | | | 34.50 |

Exected value of tier 9:   average of 33, 34, 35, 36 = 34.5

273   Estimated values of stimuli not ranked in second round

| 1.00 | 5.67 | 9.32 | 12.98 | 18.49 | 24.01 | 27.51 | 31.00 | 34.50 |
|---|---|---|---|---|---|---|---|---|
| 2.28 | 8.31 | 8.80 | 9.29 | 14.95 | 20.61 | 25.24 | 29.87 | 34.50 |
| 7.43 | 3.30 | 9.86 | 16.43 | 22.06 | 27.70 | 29.96 | 32.23 | 34.50 |
| 4.11 | 12.28 | 14.32 | 16.36 | 18.47 | 20.59 | 22.13 | 29.86 | 34.50 | tier 1   tier 2   tier 3   tier 4   tier 5   tier 6   tier 7   tier 8   tier 9

| 1.00 | 5.67 | 9.32 | 12.98 | 18.49 | 24.01 | 27.51 | 31.00 | 34.50 |
|---|---|---|---|---|---|---|---|---|
| 2.28 | 8.31 | 8.80 | 9.29 | 14.95 | 20.61 | 25.24 | 29.87 | 34.50 |
| 7.43 | 3.30 | 9.86 | 16.43 | 22.06 | 27.70 | 29.96 | 32.23 | 34.50 |
| 4.11 | 12.28 | 14.32 | 16.36 | 18.47 | 20.59 | 25.23 | 29.86 | 34.50 |

127 RANDOMIZED LIST

132 FIRST ROUND RANKING SUBSETS

147 GRID RANKED WITHIN EACH SUBSET

157 FORMULATE SECOND ROUND RANKING SUBSETS

167 TABLE OF PROFILE VALUES

162 GRID OF ASSIGNED VALUES OF ALL SECOND ROUND RANKINGS

172 ESTIMATE VALUE FOR EACH STIMULI NOT RANKED IN SECOND ROUND

177 RESPONDENT ANSWER SET PROGRESSION OF RANKING DECISIONS AND ESTIMATED RANKING VALUES

SURVEY PROCESS

SURVEY PROCESS

ESTIMATE OF VALIDITY BASED ON A MEASURE OF INTERNAL CONSISTENCY

FIGURE 3B
ESTIMATE OF VALIDITY BASED ON A MEASURE OF INTERNAL CONSISTENCY

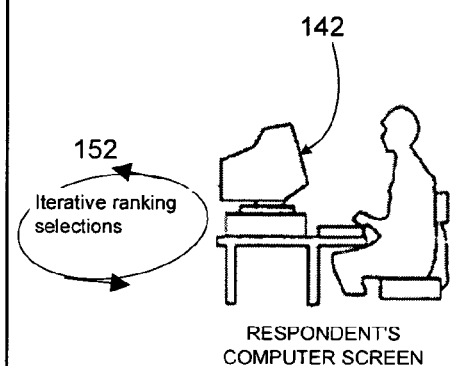

375
HIGH_ONE second round ranking subset

| | tier 1 | tier 2 | tier 3 | tier 4 | tier 5 | tier 6 |
|---|---|---|---|---|---|---|
| A1 | | | | | | |
| B1 | | | | | | |
| C1 | | | | | | |
| D1 | | | | | | |

376
HIGH_ONE second round ranking subset modified for the consistency test

| | tier 1 | tier 2 | tier 3 | tier 4 | tier 5 | tier 6 |
|---|---|---|---|---|---|---|
| A1 | | | | | | |
| B1 | | | | | | |
| C1 | | | | | | C6 |
| D1 | | | | | | D6 |

MID_ONE second round ranking subset

| tier 1 | tier 2 | tier 3 | tier 4 | tier 5 | tier 6 |
|---|---|---|---|---|---|
| | | | | | |
| | | | | | |
| | | | | | |
| | | | | | |

HIGH_ONE SECOND ROUND RANKING SUBSET

HIGH_ONE SECOND ROUND RANKING SUBSET CONSISTENCY TEST

MID_ONE SECOND ROUND RANKING SUBSET

142

152
Iterative ranking selections

RESPONDENT'S COMPUTER SCREEN

Probability that either randomly chosen tier 6 stimlus will be ranked above one or more tier 1 stimuli

381

| Decision Levels | |
|---|---|
| % of invalid responses eliminated | % of valid responses eliminated |
| TRUE POSITIVES | FALSE POSITIVES |
| 97% | 0.6% |

FIGURE 4
ESTIMATE OF VALIDITY BASED ON A MEASURE OF ORDER BIAS

402
Original Position

| Ranking Subset | tier 1 | tier 2 | tier 3 | tier 4 | tier 5 |
|---|---|---|---|---|---|
| A | A1 | A2 | A3 | A4 | A5 |
| B | B1 | B2 | B3 | B4 | B5 |
| C | C1 | C2 | C3 | C4 | C5 |
| D | D1 | D2 | D3 | D4 | D5 |
| E | E1 | E2 | E3 | E4 | E5 |

One measure of order bias: number of first positioned stimuli that are selected as the top ranking stimuli in ranking subset

407
rank within subsets

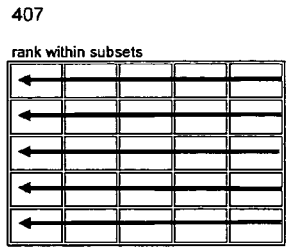

Total Number of first position stimuli ranked first

412
Position after first round rankings

| A1 | An | An | An | An |
|---|---|---|---|---|
| B1 | Bn | Bn | Bn | Bn |
| C1 | Cn | Cn | Cn | Cn |
| D1 | Dn | Dn | Dn | Dn |
| E1 | En | En | En | En |

417
5    Probability of less than 0.04 %
4    Probability of less than 0.65 %
3    Probability of less than 5.12 %

422
Original Position

| Ranking Subset | tier 1 | tier 2 | tier 3 | tier 4 | tier 5 | tier 6 |
|---|---|---|---|---|---|---|
| A | A1 | A2 | A3 | A4 | A5 | A6 |
| B | B1 | B2 | B3 | B4 | B5 | B6 |
| C | C1 | C2 | C3 | C4 | C5 | C6 |
| D | D1 | D2 | D3 | D4 | D5 | D6 |
| E | E1 | E2 | E3 | E4 | E5 | E6 |

One measure of order bias: number of first positioned stimuli that are selected as the top ranking stimuli in ranking subset

427
rank within subsets

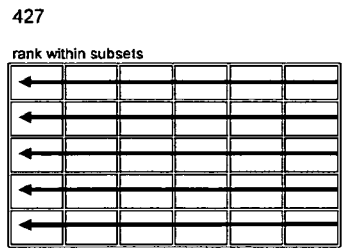

Total Number of first position stimuli ranked first

432
Position after first round rankings

| A1 | An | An | An | An | An |
|---|---|---|---|---|---|
| B1 | Bn | Bn | Bn | Bn | Bn |
| C1 | Cn | Cn | Cn | Cn | Cn |
| D1 | Dn | Dn | Dn | Dn | Dn |
| E1 | En | En | En | En | En |

437
6    Probability of less than 0.01 %
5    Probability of less than 0.16 %
4    Probability of less than 1.54 %

437
Distribution of the number of occassions the first positioned stimuli will be the highest ranking

| # of sets: | one | two | three | four | five | six |
|---|---|---|---|---|---|---|
| Permutations: | 5 | 25 | 125 | 625 | 3,125 | ##### |
| Number of occassions the first positioned stimuli is ranked highest   0 | 0.80 | 0.64 | 0.512 | 0.410 | 0.328 | 0.262 |
| 1 | 0.20 | 0.32 | 0.384 | 0.410 | 0.410 | 0.393 |
| 2 |  | 0.04 | 0.096 | 0.154 | 0.205 | 0.246 |
| 3 |  |  | 0.008 | 0.026 | 0.051 | 0.082 |
| 4 |  |  |  | 0.002 | 0.006 | 0.015 |
| 5 |  |  |  |  | 0.000 | 0.002 |
| 6 |  |  |  |  |  | 0.000 |
|  | 80% | 64% | 51.2% | 40.96% | 32.77% | 26.21% |
|  | 20% | 32% | 38.4% | 40.96% | 40.96% | 39.32% |
|  |  | 4% | 9.6% | 15.36% | 20.48% | 24.58% |
|  |  |  | 0.8% | 2.56% | 5.12% | 8.19% |
|  |  |  |  | 0.16% | 0.64% | 1.54% |
|  |  |  |  |  | 0.03% | 0.15% |
|  |  |  |  |  |  | 0.01% |

FIGURE 5A

SAMPLE REFERENCE TABLE OF PROFILE VALUES FOR EACH POSITION BY SUBSET AND TIER

Distribution of True Rank for each Second Round Rank position in a 5x5 grid in a Monte Carlo simulation of 13,131 iterations

503

| | MEAN | MEDIAN | MODE |
|---|---|---|---|
| tier ONE | | | |
| highest ranking | 1.00 | 1 | 1 |
| 2nd highest ranking | 2.18 | 2 | 2 |
| 3rd highest ranking | 3.67 | 3 | 3 |
| 4th highest ranking | 5.70 | 5 | 5 |
| 5th highest ranking | 9.06 | 9 | 8 |
| tier TWO | | | |
| highest ranking | 3.66 | 4 | 4 |
| 2nd highest ranking | 6.02 | 6 | 6 |
| 3rd highest ranking | 8.30 | 8 | 8 |
| 4th highest ranking | 10.83 | 11 | 10 |
| 5th highest ranking | 14.35 | 14 | 14 |
| tier THREE | | | |
| highest ranking | 7.25 | 7 | 8 |
| 2nd highest ranking | 10.35 | 11 | 11 |
| 3rd highest ranking | 12.96 | 13 | 13 |
| 4th highest ranking | 15.55 | 15 | 15 |
| 5th highest ranking | 18.67 | 19 | 19 |
| tier FOUR | | | |
| highest ranking | 11.58 | 12 | 12 |
| 2nd highest ranking | 15.06 | 15 | 16 |
| 3rd highest ranking | 17.62 | 18 | 18 |
| 4th highest ranking | 19.88 | 20 | 20 |
| 5th highest ranking | 22.23 | 22 | 22 |
| tier FIVE | | | |
| highest ranking | 16.88 | 18 | 18 |
| 2nd highest ranking | 20.24 | 21 | 21 |
| 3rd highest ranking | 22.26 | 23 | 23 |
| 4th highest ranking | 23.73 | 24 | 24 |
| 5th highest ranking | 25.00 | 25 | 25 |

FIGURE 5B
SAMPLE REFERENCE TABLES OF PROFILE VALUES

Profile Values determined by Monte Carlo Analyses

|     | tier 1 | tier 2 | tier 3 | tier 4 | tier 5 |
|-----|--------|--------|--------|--------|--------|
| 5X5 | 1.00   | 3.66   | 7.25   | 11.58  | 16.88  |
|     | 2.18   | 6.02   | 10.35  | 15.06  | 20.24  |
|     | 3.67   | 8.30   | 12.96  | 17.62  | 22.26  |
|     | 5.70   | 10.83  | 15.55  | 19.88  | 23.73  |
|     | 9.06   | 14.35  | 18.67  | 22.23  | 25.00  |

|     | tier 1 | tier 2 | tier 3 | tier 4 | tier 5 | tier 6 |
|-----|--------|--------|--------|--------|--------|--------|
| 6x6 | 1.00   | 3.95   | 7.92   | 12.67  | 18.27  | 25.04  |
|     | 2.16   | 6.44   | 11.38  | 16.81  | 22.69  | 29.23  |
|     | 3.55   | 8.78   | 14.26  | 19.93  | 25.70  | 31.66  |
|     | 5.30   | 11.27  | 17.08  | 22.73  | 28.19  | 33.41  |
|     | 7.75   | 14.28  | 20.14  | 25.59  | 30.52  | 34.81  |
|     | 11.94  | 18.65  | 24.24  | 29.05  | 33.03  | 35.97  |

|     | tier 1 | tier 2 | tier 3 | tier 4 | tier 5 | tier 6 |
|-----|--------|--------|--------|--------|--------|--------|
| 6x4 | 1.00   | 3.33   | 6.28   | 9.65   | 13.50  | 17.96  |
|     | 2.26   | 5.64   | 9.26   | 12.99  | 16.89  | 20.98  |
|     | 4.00   | 8.11   | 12.00  | 15.76  | 19.36  | 22.74  |
|     | 6.99   | 11.52  | 15.35  | 18.75  | 21.67  | 24.00  |

|     | tier 1 | tier 2 | tier 3 | tier 4 | tier 5 | tier 6 | tier 7 | tier 8 | tier 9 |
|-----|--------|--------|--------|--------|--------|--------|--------|--------|--------|
| 9x8 | 1.00   | 4.36   | 9.05   | 14.59  | 20.82  | 27.76  | 35.57  | 44.14  | 54.45  |
|     | 2.13   | 7.12   | 13.13  | 19.75  | 26.80  | 34.31  | 42.19  | 50.88  | 60.58  |
|     | 3.43   | 9.58   | 16.41  | 23.60  | 31.01  | 38.73  | 46.63  | 55.02  | 63.92  |
|     | 4.95   | 12.09  | 19.53  | 27.04  | 34.72  | 42.44  | 50.24  | 58.19  | 66.26  |
|     | 6.78   | 14.82  | 22.71  | 30.53  | 38.32  | 45.92  | 53.48  | 60.90  | 68.08  |
|     | 9.14   | 18.01  | 26.33  | 34.31  | 42.03  | 49.44  | 56.63  | 63.41  | 69.60  |
|     | 12.51  | 22.15  | 30.72  | 38.77  | 46.28  | 53.33  | 59.89  | 65.88  | 70.88  |
|     | 18.54  | 28.85  | 37.48  | 45.10  | 52.02  | 58.26  | 63.90  | 68.59  | 72.00  |

MONTE CARLO PERFORMANCE MEASUREMENT

SUM OF ORDERED PAIRS
AS PERFORMANCE MEASURE OF RANKING ACCURACY

FIGURE 7B
SUM OF ORDERED PAIRS vs CORRELATION
AS PERFORMANCE MEASURES OF RANKING ACCURACY

| 25 ALPHABET STIMULI | RESPONDENT ASSIGNED LIKERT 5 PT SCALE RATINGS — A RANGE OF VALID RESPONSES | | | | RESPONDENT ASSIGNED DETAILED RANK ORDER — POSSIBLE RESPONSES | | | |
|---|---|---|---|---|---|---|---|---|
| | R1 | R2 | R3 | R4 | R5 | R6 | R7 | R8 |
| A | 1 | 1 | 1 | 1 | 1 | 4 | 3 | 3 |
| B | 1 | 1 | 1 | 1 | 2 | 5 | 5 | 5 |
| C | 1 | 1 | 1 | 1 | 3 | 6 | 7 | 7 |
| D | 1 | 1 | 1 | 1 | 4 | 7 | 9 | 9 |
| E | 1 | 1 | 1 | 1 | 5 | 8 | 11 | 11 |
| F | 2 | 1 | 1 | 1 | 6 | 9 | 13 | 13 |
| G | 2 | 1 | 1 | 1 | 7 | 10 | 15 | 15 |
| H | 2 | 1 | 1 | 1 | 8 | 11 | 17 | 17 |
| I | 2 | 2 | 1 | 1 | 9 | 12 | 19 | 19 |
| J | 2 | 2 | 2 | 1 | 10 | 13 | 21 | 1 |
| K | 2 | 2 | 2 | 1 | 11 | 1 | 1 | 21 |
| L | 2 | 2 | 2 | 2 | 12 | 2 | 2 | 2 |
| M | 2 | 2 | 2 | 2 | 13 | 3 | 4 | 4 |
| N | 3 | 3 | 3 | 3 | 14 | 14 | 6 | 6 |
| O | 3 | 3 | 3 | 3 | 15 | 15 | 8 | 8 |
| P | 3 | 3 | 3 | 3 | 16 | 16 | 10 | 10 |
| Q | 3 | 3 | 3 | 3 | 17 | 17 | 12 | 12 |
| R | 3 | 3 | 3 | 3 | 18 | 18 | 14 | 14 |
| S | 4 | 4 | 4 | 4 | 19 | 19 | 16 | 16 |
| T | 4 | 4 | 4 | 4 | 20 | 20 | 18 | 18 |
| U | 4 | 4 | 4 | 4 | 21 | 21 | 20 | 20 |
| V | 5 | 5 | 5 | 5 | 22 | 22 | 22 | 22 |
| W | 5 | 5 | 5 | 5 | 23 | 23 | 23 | 23 |
| X | 5 | 5 | 5 | 5 | 24 | 24 | 24 | 24 |
| Y | 5 | 5 | 5 | 5 | 25 | 25 | 25 | 25 |

MEASURE AMONG TOP 10

| | | | | | | | | |
|---|---|---|---|---|---|---|---|---|
| CORRELATION | 0.87 | 0.70 | 0.52 | (NOTE 1) | 1.00 | 1.00 | 1.00 | 0.45 |
| SUM OF CORRECTLY ORDERED PAIRS | 160 | 160 | 156 | 140 | 195 | 165 | 130 | 141 |
| TOTAL POSSIBLE PAIRS | 195 | 195 | 195 | 195 | 195 | 195 | 195 | 195 |
| PERCENT CORRECTLY ORDERED PAIRS | 82% | 82% | 80% | 72% | 100% | 85% | 67% | 72% |

MEASURE AMONG TOTAL LIST

| | | | | | | | | |
|---|---|---|---|---|---|---|---|---|
| CORRELATION | 0.96 | 0.97 | 0.96 | 0.94 | 1.00 | 0.85 | 0.62 | 0.63 |
| SUM OF CORRECTLY ORDERED PAIRS | 243 | 243 | 239 | 225 | 300 | 270 | 235 | 236 |
| TOTAL POSSIBLE PAIRS | 300 | 300 | 300 | 300 | 300 | 300 | 300 | 300 |
| PERCENT CORRECTLY ORDERED PAIRS | 81% | 81% | 80% | 75% | 100% | 90% | 78% | 79% |

(NOTE 1) CORRELATION CANNOT BE CALCULATED WHEN ONE OF THE CORRELATION VARIABLES IS A FLAT CURVE, I.E. WHEN ALL POINTS OF THE VARIABLE ARE EQUAL

FIGURE 8
RANKING ACCURACY OF THIS INVENTION versus LIKERT SCALE RATINGS
IN THE TASK OF RANK ORDERING 25 STIMULI

| 25 ALPHABET STIMULI | LIKERT 5 POINT SCALE (812) | | INVENTION RANKING VALUES (822) | | INVENTION PROFILE VALUES (832) | | PROFILE VALUES WITH ESTIMATED VALUES (842) | |
|---|---|---|---|---|---|---|---|---|
| | RESPONDENT ASSIGNED LIKERT SCALE RATINGS | NUMBER OF CORRECTLY ORDERED PAIRS | RESPONDENT RANKING | NUMBER OF CORRECTLY ORDERED PAIRS | PROFILE VALUES | NUMBER OF CORRECTLY ORDERED PAIRS | PROFILE VALUES WITH ESTIMATED VALUES | NUMBER OF CORRECTLY ORDERED PAIRS |
| A | 1 | 17 | 1 | 24 | 1.0 | 24 | 1.0 | 24 |
| B | 1 | 17 | 2 | 23 | 2.2 | 23 | 2.2 | 23 |
| C | 1 | 17 | 3 | 22 | 3.7 | 21 | 3.7 | 22 |
| D | 1 | 17 | 6 | 19 | 3.7 | 21 | 6.3 | 19 |
| E | 1 | 17 | 7 | 18 | 6.0 | 19 | 5.5 | 20 |
| F | 1 | 17 | 11 | 14 | 7.3 | 18 | 7.3 | 18 |
| G | 1 | 17 | 12 | 13 | 10.4 | 15 | 10.4 | 14 |
| H | 1 | 17 | 8 | 15 | 8.3 | 16 | 8.3 | 16 |
| I | 2 | 12 | 4 | 16 | 5.7 | 16 | 5.7 | 16 |
| J | 2 | 12 | 9 | 14 | 10.8 | 14 | 9.3 | 14 |
| K | 2 | 12 | 16 | 9 | 11.6 | 13 | 14.5 | 11 |
| L | 2 | 12 | 17 | 8 | 15.1 | 10 | 16.0 | 9 |
| M | 2 | 12 | 5 | 12 | 9.1 | 12 | 9.1 | 12 |
| N | 3 | 7 | 13 | 10 | 13.0 | 11 | 13.0 | 11 |
| O | 3 | 7 | 10 | 10 | 14.4 | 10 | 13.9 | 10 |
| P | 3 | 7 | 21 | 4 | 16.9 | 8 | 21.7 | 0 |
| Q | 3 | 7 | 14 | 8 | 15.6 | 8 | 15.6 | 8 |
| R | 3 | 7 | 15 | 7 | 18.7 | 6 | 18.7 | 5 |
| S | 4 | 4 | 18 | 6 | 17.6 | 6 | 18.6 | 5 |
| T | 4 | 4 | 19 | 5 | 19.9 | 5 | 17.3 | 5 |
| U | 4 | 4 | 20 | 4 | 22.2 | 3 | 20.2 | 4 |
| V | 5 | 0 | 22 | 3 | 20.2 | 3 | 21.7 | 0 |
| W | 5 | 0 | 23 | 2 | 22.3 | 2 | 21.7 | 0 |
| X | 5 | 0 | 24 | 1 | 23.7 | 1 | 21.7 | 0 |
| Y | 5 | 0 | 25 | 0 | 25.0 | 0 | 21.7 | 0 |

MEASURE AMONG TOP 10

| | | | | | | | | |
|---|---|---|---|---|---|---|---|---|
| SUM OF CORRECTLY ORDERED PAIRS | | 160 | | 178 | | 187 | | 186 |
| TOTAL POSSIBLE PAIRS | | 195 | | 195 | | 195 | | 195 |
| PERCENT CORRECTLY ORDERED PAIRS | | 82% | | 91% | | 96% | | 95% |

MEASURE AMONG TOTAL LIST

| | | | | | | | | |
|---|---|---|---|---|---|---|---|---|
| CORRELATION | | 0.97 | | 0.90 | | 0.98 | | 0.95 |
| SUM OF CORRECTLY ORDERED PAIRS | | 243 | | 267 | | 285 | | 266 |
| TOTAL POSSIBLE PAIRS | | 300 | | 300 | | 300 | | 300 |
| PERCENT CORRECTLY ORDERED PAIRS | | 81% | | 89% | | 95% | | 89% |

RANK WITHIN SUBSETS

RANK WITHIN TIERS

MONTE CARLO RANKING ACCURACY FOR A RANGE OF SURVEY CONFIGURATIONS

MONTE CARLO RANKING ACCURACY FOR THE TOP 20 RANKED STIMULI
IN A RANGE OF SURVEY CONFIGURATIONS

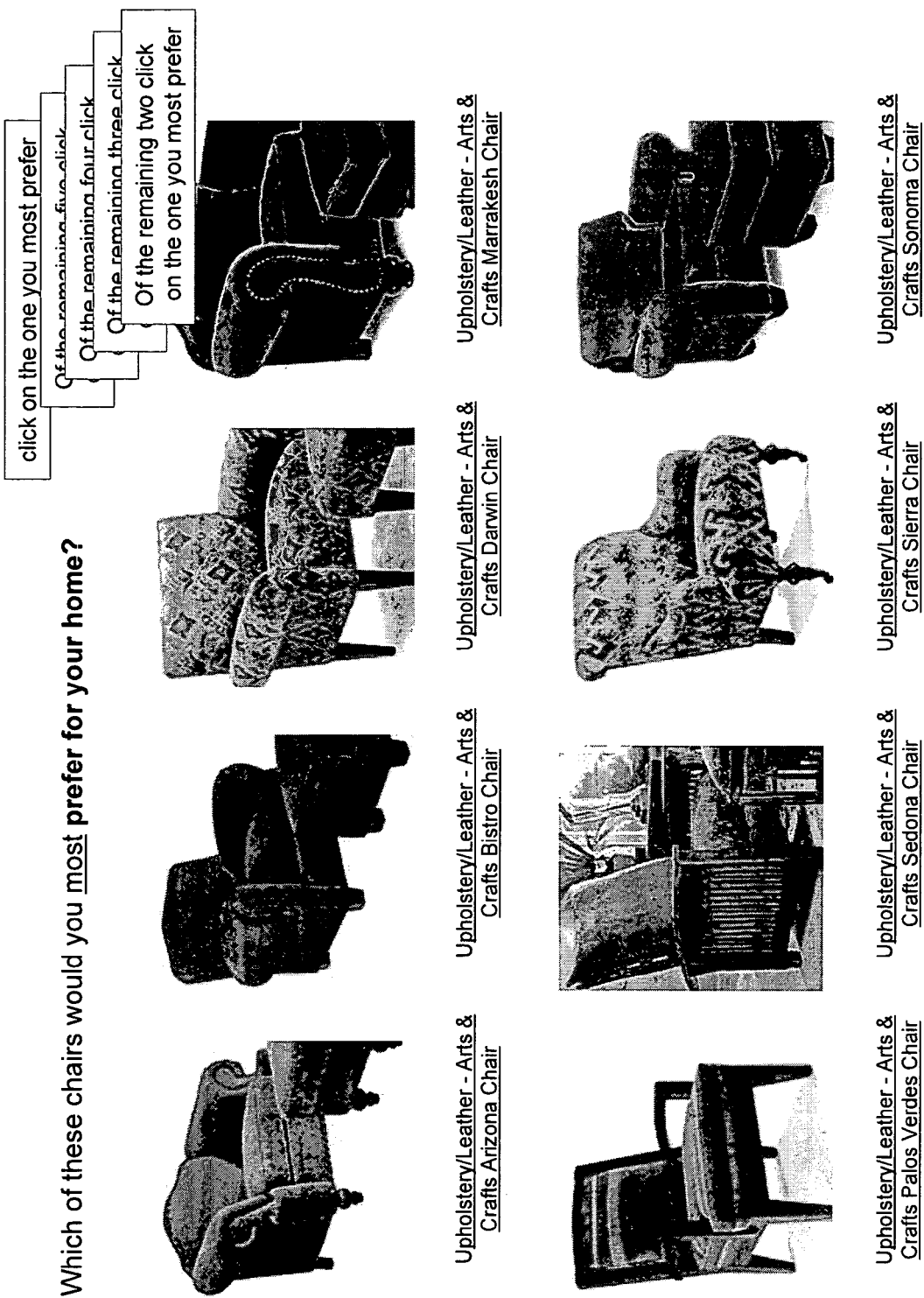

Screen Layout Options

FIGURE 12
Monadic Testing of Comparison Sensitive Variables

Only one monadic variable alternative is presented to each respondent

1202
Respondent test cell ONE

| Y | R | O | U | M |
|---|---|---|---|---|
| D | $B_1$ | G | P | L |
| C | W | E | K | F |
| S | A | Q | H | X |
| J | N | I | T | V |

1207
Respondent test cell TWO

| P | U | G | W | C |
|---|---|---|---|---|
| S | $B_2$ | M | H | A |
| I | R | N | T | J |
| E | D | K | F | L |
| X | O | V | Q | Y |

1212
Respondent test cell THREE

| F | D | K | H | X |
|---|---|---|---|---|
| Q | $B_3$ | O | N | G |
| A | R | E | P | Y |
| M | L | I | C | T |
| W | V | U | J | S |

1217
Respondent test cell THREE

| J | O | W | N | D |
|---|---|---|---|---|
| X | $B_4$ | R | F | Q |
| V | C | G | A | L |
| T | U | S | E | M |
| I | Y | K | P | H |

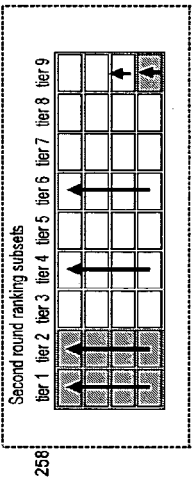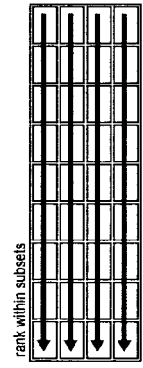
Figure 13

Figure 14

The Likert Scale is most well known and most broadly used scale question format

What is a Likert Scale?

A Likert scale measures the extent to which a person agrees or disagrees with the question. The most common scale is 1 to 5. Often the scale will be 1=strongly disagree, 2=disagree, 3=not sure, 4=agree, and 5=strongly agree." [www.uni.edu/its/us/document/stats/spss2.html#lik]

Likert scale example one

The respondent is instructed to check the one answer that most reflects their opinion.

| | strongly disagree | somewhat disagree | not sure | somewhat agree | strongly agree |
|---|---|---|---|---|---|
| Earning a college degree in necessary to get a good job. | ① | ② | ③ | ④ | ⑤ |
| Serving is the military helps develop character. | ① | ② | ③ | ④ | ⑤ |

Likert scale example two

The respondent is instructed to check the circle that most reflects their opinion.

| | | |
|---|---|---|
| UFOs have visited earth. | TRUE ○ ○ ○ ○ ○ | FALSE |

Figure 15A

Q-Sort rank ordering

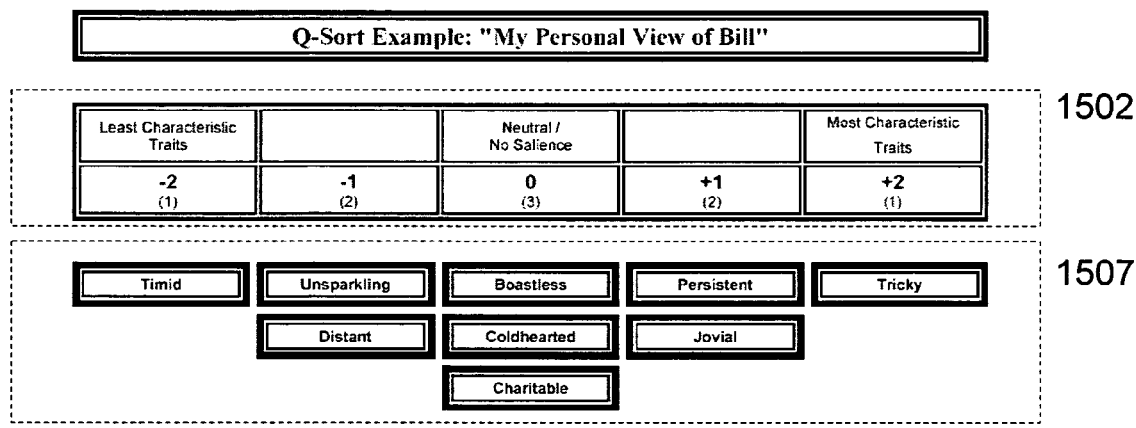

The usual technique involves a *forced sort*, i.e. putting under each point on the continuum a prescribed number of cards. The distribution of the pile sizes usually follows a modification of a (flattened) normal curve as displayed in the following example of a finished Q-sort:

Note that this example serves demonstration purposes only, and that the very small number of very simple items should not be misrepresented as in any way typical for Q-samples in general. The same example will be shown later in WebQ's layout, and it is also used for the Sample WebQ.

*Strategy for rank-ordering a Q-sample, procedural steps.* How was this example Q-sort (provided by an anonymous observer of Bill's character) arrived at? In addition to the well-shuffled pack of cards, the subject in a Q-sort session is provided with either a single long ruler or a set of separate distribution marker cards which would represent the ranking continuum with its pile categories (-2 through +2) under which the cards will be layed out in the prescribed distribution (1 - 2 - 3 - 2 - 1), and a detailed step-by-step instruction. The general idea of the sorting strategy is to begin with presorting items into three piles (*left*: disagree - *middle*: neutral - *right*: agree), then pick out the most significant representatives of both, the extreme right (+2), and for the extreme left pile (-2), and then continue to work towards the center of the ranking continuum. A prototypical set of instructions is given by McKeown & Thomas (1988, p. 31f.). However, note that the following quotation refers to a more typical Q-sort design with 11 piles (-5 through +5, with frequencies 3-4-4-7-7-10-7-7-4-4-3):

http://www.rz.unibw-muenchen.de/~p41bsmk/qmethod/webq/webqdoc.htm

Figure 15B

Layout

WebQ Ranking-Frame Layout

| On Startup | When Finished |
|---|---|

On Startup — Most characteristic trait (+2)

| +2 | ■ | -2 | -1 | 0 | +1 | +2 |
|---|---|---|---|---|---|---|
| +1 | ■ ■ | -2 | -1 | 0 | +1 | +2 |
| 0 | ▣ ▣ ▣ | -2 | -1 | 0 | +1 | +2 |
| | 2. Unsparkling | ○ | ○ | ● | ○ | ○ |
| | 5. Timid | ○ | ○ | ● | ○ | ○ |
| | 3. Persistent | ○ | ○ | ● | ○ | ○ |
| | 8. Jovial | ○ | ○ | ● | ○ | ○ |
| | 7. Charitable | ○ | ○ | ● | ○ | ○ |
| | 6. Tricky | ○ | ○ | ● | ○ | ○ |
| | 9. Distant | ○ | ○ | ● | ○ | ○ |
| | 4. Coldhearted | ○ | ○ | ● | ○ | ○ |
| | 1. Boastless | ○ | ○ | ● | ○ | ○ |
| -1 | ■ ■ | -2 | -1 | 0 | +1 | +2 |
| -2 | ■ | -2 | -1 | 0 | +1 | +2 |

(-2) Least characteristic trait

When Finished — Most characteristic trait (+

| +2 | ▣ | -2 | -1 | 0 | +1 | +2 |
|---|---|---|---|---|---|---|
| | 6. Tricky | ○ | ○ | ○ | ○ | ● |
| +1 | ▣ ▣ | -2 | -1 | 0 | +1 | +2 |
| | 3. Persistent | ○ | ○ | ○ | ● | ○ |
| | 8. Jovial | ○ | ○ | ○ | ● | ○ |
| 0 | ▣ ▣ ▣ | -2 | -1 | 0 | +1 | +2 |
| | 7. Charitable | ○ | ○ | ● | ○ | ○ |
| | 4. Coldhearted | ○ | ○ | ● | ○ | ○ |
| | 1. Boastless | ○ | ○ | ● | ○ | ○ |
| -1 | ▣ ▣ | -2 | -1 | 0 | +1 | +2 |
| | 2. Unsparkling | ○ | ● | ○ | ○ | ○ |
| | 9. Distant | ○ | ● | ○ | ○ | ○ |
| -2 | ▣ | -2 | -1 | 0 | +1 | +2 |
| | 5. Timid | ● | ○ | ○ | ○ | ○ |

(-2) Least characteristic trait

WebQ is a computer implementation of the Q-sort technique which requires the respondent to rank-order a set of stimuli (typically, statements of opinion) according to a certain condition of instruction (e.g., on a continuum ranging from -5: *least agree* to +5: *most agree*). Initially, all items, ordered randomly, are placed within the neutral category pile, with the *0* radio buttons checked. Piles of items (initially empty except for the neutral pile) are ordered vertically with the most positive category on top, and the most negative category on bottom. Items are moved to and from piles by first changing checked radio buttons and then clicking on an 'Update button.' For each pile, the number of box icons signifies how many items are to be sorted into that pile. Different colors of the box icons show whether there are too few, too many or the correct number of items in the pile. When Q-sorting is finished, and the 'Send' button clicked, the response will be delivered to the researcher's email address.

http://www.rz.unibw-muenchen.de/~p41bsmk/qmethod/webq/webqdoc.htm

Figure 16

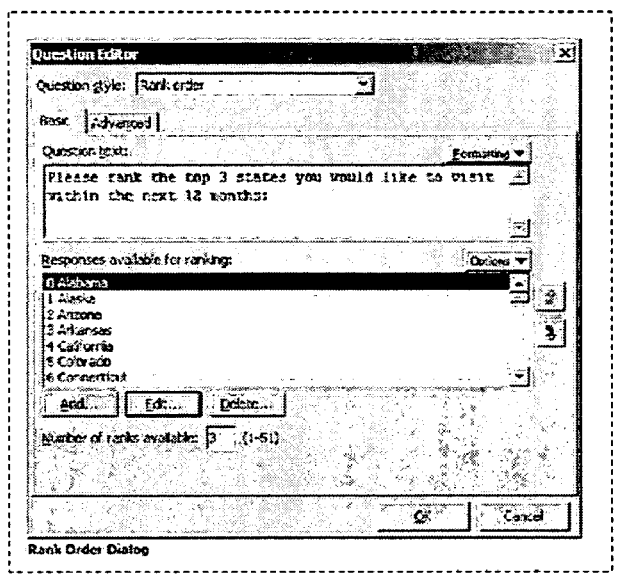

1602

Rank order question format from the commercially popular WebSurveyor Online Internet based survey program.

Tip!
The most effective ranking questions contain 3-5 items to rank. 10 items is the maximum you should ask a user to rank. While you can have a large number of response options to choose from the number of ranks available should be relatively low.

Please rank the top 3 states you would like to visit within the next 12 months:

THE HARTMAN VALUE PROFILE (HVP)
PART I - PHRASES

ORIGINAL EDITION by Robert S. Hartman, Ph.D. and Mario Cardenas Trigos, M.D.

1702   1707

| Directions | Practice | | Final |
|---|---|---|---|
| On the right you will find 18 words or phrases. Each of these phrases (or words) represents something on which individuals may place different "values" (good or bad) -- depending on their own feelings about how good or bad it is.<br><br>Read all the phrases carefully. (If there is a word that you do not understand, ask what it means.)<br><br>Write the number "1" in the box by the phrase which represents the highest (most) value as far as you are concerned—that is, the one you feel is the best.<br><br>Write the number "2" in the box by the phrase which represents the next best (second best) value, with next most (second most).<br><br>Number all of the phrases in the same way, to show the order of their respective values to you. Use a different number for each of the 18 phrases (3, 4, 5 and so on). The number "18" should be in front of the word or phrase that has the lowest (least) value to you--that is the one that you feel is the worst.<br><br>Use the column of boxes on the left of the quotations for practice. Check to be sure the number you have assigned each quotation expresses your feeling, making any necessary changes. Then copy the numbers in the final column of boxes on the right.<br><br>Decide quickly how you feel about each of the phrases. There is no time limit, but most people are able to complete numbering all the quotations in about twelve to fifteen minutes. You may begin. | ☒ | A good meal | ☒ |
| | ☒ | A technical improvement | ☒ |
| | ☒ | Nonsense | ☒ |
| | ☒ | A fine | ☒ |
| | ☒ | A rubbish heap | ☒ |
| | ☒ | A devoted scientist | ☒ |
| | ☒ | Blow up an airliner in flight | ☒ |
| | ☒ | Burn a heretic at the stake | ☒ |
| | ☒ | A short-circuit | ☒ |
| | ☒ | "With this ring, I thee wed." | ☒ |
| | ☒ | A baby | ☒ |
| | ☒ | Torture a person in a concentration camp | ☒ |
| | ☒ | Love of nature | ☒ |
| | ☒ | A madman | ☒ |
| | ☒ | An assembly line | ☒ |
| | ☒ | Slavery | ☒ |
| After you have finished, please CHECK to make sure that you have used all the numbers from 1 through 18, without repeating any. (Start with your number 1 and find each number up through 18.) | ☒ | A mathematical genius | ☒ |
| | ☒ | A uniform | ☒ |

Copyright Owner:
The Robert S. Hartman Institute

Cross out numbers used:
1  2  3  4  5  6  7  8  9  10  11  12  13  14  15  16  17  18

1712 http://www.hartmaninstitute.org/html/OriginalHVP.htm

METHOD FOR ESTIMATING RESPONDENT RANK ORDER OF A SET STIMULI

CROSS REFERENCE TO RELATED APPLICATIONS

This application claims priority to U.S. Provisional patent application No. 60/503,687 filed on Sep. 17, 2003 and incorporates by reference that document in its entirety.

FIELD OF THE INVENTION

This invention relates to a software tool for obtaining a rank order list of a set of choices provided to a respondent. The tool can also be used to aggregate the responses from a number of respondents. More particularly, the survey tool can utilize the distributed access afforded by the internet or local area networks (LANs) to collect and tabulate user responses to a particular format of question to ascertain an approximation of a respondent's rank order preference for a set of choices that cannot be readily displayed on a single display screen.

Many organizations of all types (including but not limited to business, educational, social and political organizations) use market research to gain insights into the opinions and viewpoints of customers and clienteles as input for management, programming, marketing and policy decisions. Much of this research is conducted by company employees so the economic resources devoted to research is not reported separately; therefore, the full level of economic resources devoted to market research far exceeds the $2 Billion reported by the American Marketing Association spent on market research through their market research member firms in the year 2000.

This invention provides an efficient and effective means to determine an individual's or a set of respondents' rank order of preference or importance among a number of attribute options (i.e. alternative prices, features, benefits, ways of expressing benefits, brand names, slogans, logos, graphic treatments such as package design elements and any other stimuli that the researcher believes may influence the individual's opinion and can be expressed as a statement, graphic or brief audio). The methodology is designed for those instances when the number of stimuli exceeds the number that can be presented at one time to a respondent, most typically, the number that can be legibly displayed on one computer screen for rank ordering by a respondent.

BACKGROUND OF THE INVENTION

Current opinion research practice for rank ordering the importance of lists of feature or benefit stimuli generally use one of four approaches.
1. Direct rank ordering
2. Likert scale ratings
3. Q-Sort
4. Conjoint analysis 1. Direct Rank Ordering: Most Internet based survey platforms offer a direct ranking question format similar to the format shown in FIG. 16. The respondent is presented a list and asked to indicate the most to the least important on the basis of some specified criteria 1602. A variation on this approach is to ask respondents to select their top choices from a list of choices presented on one screen 1612.

Among established off-line research studies, the Hartman Value Profile, FIG. 17, is one example of a standard test that utilizes a direct rank order exercise. Respondents are presented 18 choices 1702 on one page and are asked to rank order the list. To guide respondents through the exercise, the survey form offers a work area to cross out rankings as they are assigned 1712 and the survey form presents the exercise as a "practice" followed by a "final" ranking 1707, all on one sheet.

Limitations of Direct Rank Ordering: Direct rank ordering provides the most precise rank ordering for a short list of choices, however, direct rank ordering is limited in the number of stimuli a respondent can effectively consider in one ranking exercise. In an online survey, the other practical limit for a direct rank ordering is the number of alternatives that can be effectively presented on one screen.

2. Likert Scale Ratings: In 1932, Renis Likert invented a unidimensional scaling measurement method, called the Likert Scales, for use in attitude surveys. It allowed answers that ranged from "strongly disagree" to "strongly agree" see FIG. 14. While numerous researchers have developed a multitude of scale variations over the past 70 years and almost every Internet survey platform offers an online version of the Likert scale, the basic methodology remains little changed.

A Likert scale is an ordered scale from "most" to "least" of some attribute, generally presented as a five or seven point scale with the mid-point presented as the neutral point on the scale, "neither like nor dislike". Respondents are asked to rate a number of stimuli. An approximation of the rank order of a set of test stimuli can be inferred from Likert scale rating scores.

Likert scales are likely the most commonly used research question design for collecting data for ranking the importance of test variables. The popularity of Likert scales for marketing research is illustrated by the American Marketing Association publication of the Marketing Scales Handbook. The most recent handbook, Volume III, published in 2001, presents 941 Likert scales selected from articles published in the top marketing journals between 1994 and 1997. Combining this volume with the previous two, researchers have easy access to nearly 2000 Likert scales.

Marketing Scales Handbook: A Compilation of Multi-Item Measures, Volume III Gordon C. Bruner II, Karen E. James, and Paul J. Hensel, editors Limitations of Likert Scale Ratings:

Level of precision: A key limitation of Likert scale ratings is that the level of precision is limited by the number of respondent choices on the scale (generally 5 to 7). Many stimuli may be rated at the same level thus providing no insight for comparisons among those equally rated stimuli. This limitation is particularly vexing for respondents who answer all rating questions at the high end of the scale or at the low end of the scale, respondent yea-sayers and naysayers.

Number of rating questions may result in respondent fatigue: A second limitation of Likert scales is the well recognized potential for diminished quality of response that can result from respondent fatigue from answering a long list of scale questions. Most professional researchers limit the number of Likert scales questions to fewer than 20 in an effort to guard against respondent fatigue. Respondent fatigue is a problem in two respects: 1) respondent fatigue diminishes the quality of response and 2) the reduced quality of response cannot be readily detected so response sets with reduced quality cannot be purged from the study results.

Rating frame drift and order bias: There is a tendency for a respondent's evaluations to drift higher or lower as they progress through a bank of rating scales. This is a form of order bias. A typical strategy to moderate the effect of order bias is to rotate the order of presentation of questions so that the overall rating of each stimulus is equally affected. While this can effectively neutralize order bias for the composite sample, the options for measuring order bias for individual respondents are limited. The lack of a mechanism to detect and measure order bias for individual respondents limits the utility of Likert scale data for segmentation analyses in which individuals' opinion profiles are the focus of the analysis.

Quality assurance practices: Since it is difficult to measure the quality of response to a set of Likert scales, some online research services eliminate yea-sayers and naysayers as a standard quality assurance practice. Some researchers also eliminate respondents whose answer sets are significantly different from the typical respondent in the study. These respondents, often labeled as "outliers", are assumed to be invalid because they are different. These practices can eliminate some valid respondents and in so doing skew the overall conclusions of a study.

3. Q-Sort Ranking: The Q-Sort technique, see the example in FIGS. 15A and 15B, is a forced sort, i.e. putting under each point on the continuum a prescribed number of cards. The distribution of the piles usually follows a modification of a (flattened) normal curve 1507. Piles may be prescribed for five points up to 11 points 1502/1512. Procedures often call for the respondent to begin by sorting the cards into three piles, disagree, neutral and agree, then proceed to spread the cards across the continuum.

While the attention required of the respondent to sort cards in a manual sort or attributes listed on the screen in an online version of the methodology, may improve the accuracy of the final sort, the rigor of the sort requirements detracts from ease of use for respondents. Further, the Q-Sort methodology presumes that any list of attributes or characteristics will be about half positive and half negative which may not be an accurate framework for a benefit test or concept test in which the objective is to only include only positive attributes.

The greatest limitation of an online Q-Sort is that consideration of attributes for ranking is limited by the number of options the respondent can see on the screen and simultaneously consider for a sort.

4. Conjoint analysis: The defining structure of a conjoint analysis is the evaluation of utility functions of variables within a range of values for each variable by constructing stimuli that are combinations of values for the subject variables. Respondents are asked to weight their preference for these constructed stimuli. A structured sampling of these constructed stimuli provides a basis to mathematically infer the importance weight of the values within the range tested for each variable in the test. This approach is generally limited to three to five values of three to ten variables.

Limitations of Conjoint Analysis: While conjoint analysis provides valuable insights regarding the importance of the value of variables, conjoint analysis is limited in the number of variables, generally limited to fewer than 10, that can be practically evaluated in a study. Further, conjoint analysis is largely limited to variables that can be expressed in degrees of value.

SUMMARY OF SELECTED ADVANTAGES OVER THE LIMITATIONS IN PRIOR ART

Thus despite a variety of tools in the prior art, the prior art does not provide a totally satisfactory answer suitable for use in obtaining a respondent's preferences when presented with more choices than can be presented in a single set such as on a single computer screen. The prior art direct ranking options are limited in the number of options that can be presented while the prior art rating options are limited by respondent fatigue and the inefficiencies of the process of converting ratings into rankings. The present invention improves on the capacity limitations of prior art solutions by providing an effective means to integrate the results of multiple subset rankings into an accurate estimate of overall rank order of importance for a set of opinion research stimuli from fewer than 12 to 100 or more stimuli.

Further, aside from issues of respondent fatigue that limit the capacity of prior art solutions to reliably rank order sizable numbers of stimuli, the present invention has demonstrate a significantly higher level of accuracy in estimating the rank order of a list of stimuli in a Monte Carlo analysis of simulated respondents. The accuracy advantage for the present invention increases as the number of stimuli increases.

Prior art solutions provide limited options for measuring or validating the quality of individual respondent answer sets. The present invention provides two independent means to validate that individual respondent answer sets represent the considered opinion of an attentive respondent. These validity tests are made possible by the unique structure of the multi-screen ranking process. The primary benefit of validating the quality of individual respondent answer sets is the option to eliminate answer sets that do not represent the true opinion of a respondent thus eliminate a source of meaningless variance which improves the statistical reliability of the conclusions drawn from the remaining set of valid responses.

While forced ranking prior art solutions require yea-sayer and naysayer respondents to express an opinion among stimuli, the most commonly used prior art solution for eliciting respondent ranking opinions, rating scales, is not structured in a manner to address the issue except to eliminate the extreme yea-sayer and naysayer respondents from the study analysis. The present invention requires all respondents to express their preference among the stimuli then validates through an internal consistency test and an order bias test that the respondent was attentive and provided a considered set of answers. In this manner the present invention provides a solution that measures the opinions of a broader segment of respondents thus providing a more complete sampling of the universe of respondents.

The principal advantages of the present invention compared to prior art solutions is the capacity to measure a larger number of stimuli with a greater level of accuracy and with the capacity to validate the quality of individual answer sets. The end result is a higher quality data set from opinion research studies as the foundation for more definitive research conclusions.

The various advantages over the prior art described in this document may be achieved individually and/or in combination, and it is not intended that the present invention be construed as requiring two or more of the advantages be present in any particular embodiment of the present invention unless this is expressly required by the claims that follow any patent issued based on this disclosure.

BRIEF DESCRIPTION OF THE DRAWINGS

FIG. 2A illustrates the survey process with a simple example of rank ordering 25 stimuli. For clarity of presentation, all examples present letters of the alphabet as the stimuli. In an application of this invention, stimuli may be concept statements, product features, sales benefits, incentive offers, presented as text, graphics, audio or video.

FIG. 2B presents an example of a somewhat larger ranking of 36 stimuli to illustrate how the survey process can extrapolate form a limited number of ranking decisions to estimate the rank order of the total set of options.

FIGS. 3A and 3B illustrate the structure of a non-obvious validity test based on internal consistency that can identify respondents who were not attentive as they took the survey. This innovation is made possible by the unique structure of the multiscreen ranking process. It provides a research manager a new means of improving the quality of opinion research by eliminating 90% or more of invalid answer sets.

FIG. 4 illustrates a second validity test based on a measure of order bias which can be applied concurrently with the consistency validity test to identify invalid answer sets. This validity test is also made possible by the unique structure of the multi-screen ranking process.

FIG. 5A summarizes a Monte Carlo analysis to identify a set of profile values which improve the estimates of the overall rank order of items that are ranked in two cross-grid ranking subsets. Each survey configuration requires a unique profile value reference table. 5B presents profile value reference tables for four survey configurations.

FIGS. 7A and 7B introduce a method of calculating the sum of ordered pairs as a measure of ranking accuracy which has advantages over correlation as a measure. Notably, the sum of ordered pairs can evaluate the accuracy of a subset of the total ranking such as accuracy in ranking the top of a list which is often important to decision makers. Measuring the ranking accuracy of a subset of a list with a correlation measure is problematic. Examples are provided in the chart.

FIG. 8 illustrates the ranking accuracy of the simplest version of the invention based on numeric ranking values. Building on that example, the chart reports the level of accuracy improvement from two enhancements in the process 1) the use of profile values rather than numeric ranking values and 2) the use of structured estimation to reduce the number of respondent questions while maintaining a high level of rank order accuracy. The table illustrates that each level of the invention exceeds the ranking accuracy of a Likert scale rating of the same 25 stimuli example. Likert scale ratings are the most commonly used prior art solution for the task of rank ordering stimuli in opinion research.

FIG. 12 illustrates how the survey invention can be structured to test comparison sensitive variables such as price points in a monadic format so that a monadic comparison can run concurrent with a rank ordering exercise.

FIG. 13 reports the ranking accuracy performance of two variations of the non-forced choice version of the survey process versus a forced choice version of the same 9×4 configuration. While overall accuracy of non-forced choice declined, the accuracy ranking the top 10 stimuli remained at the same high level of 97% and the total length of the survey was reduced by more than half. Shortening the survey reduces respondent fatigue and contributes to a higher quality of response.

FIG. 14 illustrates the prior art of Likert rating scales.

FIGS. 15A and 15B illustrate the prior art of Q-Sort rank ordering.

FIG. 16 illustrates the prior art direct rank ordering

FIG. 17 illustrated the prior art of the Hartman Value Profile.

DETAILED DESCRIPTION OF THE DISCLOSED EMBODIMENTS

This invention may be embodied in many different forms and should not be construed as limited to the limited number of disclosed embodiments as these embodiments are provided so that this disclosure will be thorough and complete, and will fully convey the scope of the invention to those skilled in the art. Like numbers refer to like elements throughout.

The present invention is a computer based survey methodology and platform that efficiently ascertains an approximation of a respondent's rank order preference for a set of choices that cannot be readily displayed on a single display screen. One commercial product that embodies one implementation of aspects of the present invention is Motivation Map software available from Mentor Marketing, LLC of Durham, N.C.

The number of options a respondent can consider in one rank ordering exercise varies depending upon the respondent's familiarity with the options presented and the length and complexity of the options. For example, a citizen of this country can easily rank order the fifty states on some criteria (e.g. which states they most prefer as a vacation destination) because they are familiar with the list of states and the stimuli are relatively short, one or two words. The names of all fifty states can easily be listed on one computer screen in legible type as a prompt for the respondent's choices. Whereas, if the respondent was asked to rank their preference among a set of paragraph descriptions of vacation packages, the number of options the respondent could effectively consider in one ranking exercise would be considerably fewer. In the context of an online survey, the practical limitation for a rank ordering exercise is the number of options that can be legibly presented on one computer screen.

The present invention is designed to effectively ascertain an approximation of a respondent's rank order preference for a set of choices that cannot be readily presented in one set such as too many choices to be displayed on a single display screen. Given that opinion research stimuli (such as 1)sentence length product benefit statements, 2)product feature descriptions, or 3)paragraph descriptions of vacation packages) may only be effectively presented as small sets of 4 to 20 statements per computer screen, the number of occasions to apply this invention are numerous.

Survey and Analysis Process

The present invention provides a means to estimate the rank order of importance of a large number of benefits, attributes or factors that may contribute to an individual's preference or decision to take an action such as purchase a product, join an organization, vote for a candidate or support a cause. The process can be applied to determine the rank order of importance for an individual or for a set of respondents chosen to represent some segment of the population.

Figure 1:
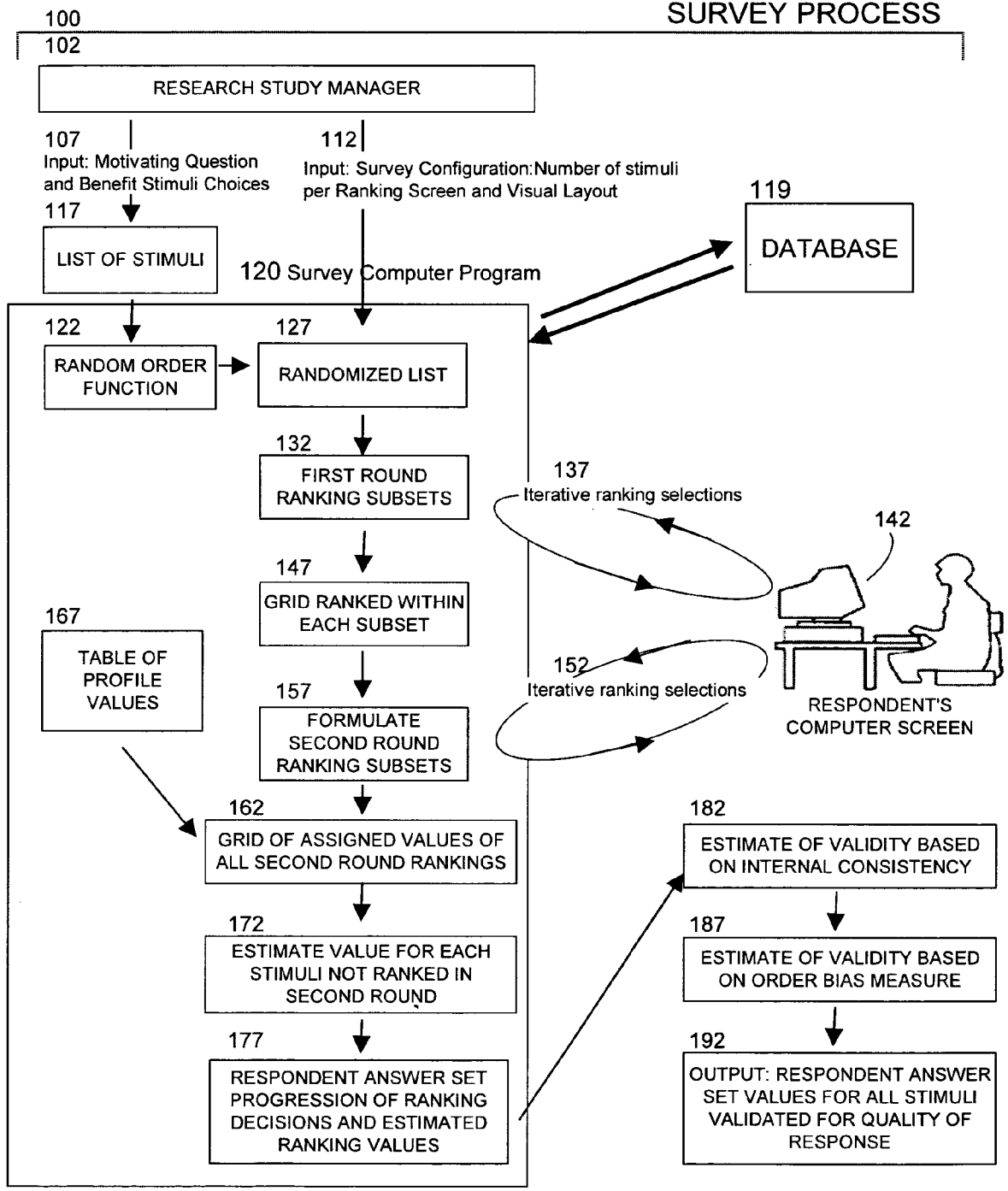
FIG. 1 illustrates the sequence of steps in the survey process from the input provided by the survey manager through structuring of ranking screens for the iterative ranking presentation to respondents to the validation steps that ensure the quality of each respondent answer set.

The process FIG. 1 100 begins with the research study manager 102 identifying the motivating question 107 and a list of factors: benefits, attributes, warrantees, endorsements, purchase incentives and any other factors that are believed may influence the customer's decision regarding the motivating question. This list of factors becomes the benefit stimuli choices in the survey 117. These stimuli may be statements, graphics, pictures, audio, video or any combination of these communication elements. The list may number from 12 or fewer to 100 or more. The full benefits of the process are best realized when the number of stimuli exceeds the number that can be comfortably presented to the respondent in one subset, such as exceeding the number of stimuli that can be viewed on a single computer screen for rank ordering by an individual.

Figure 11:
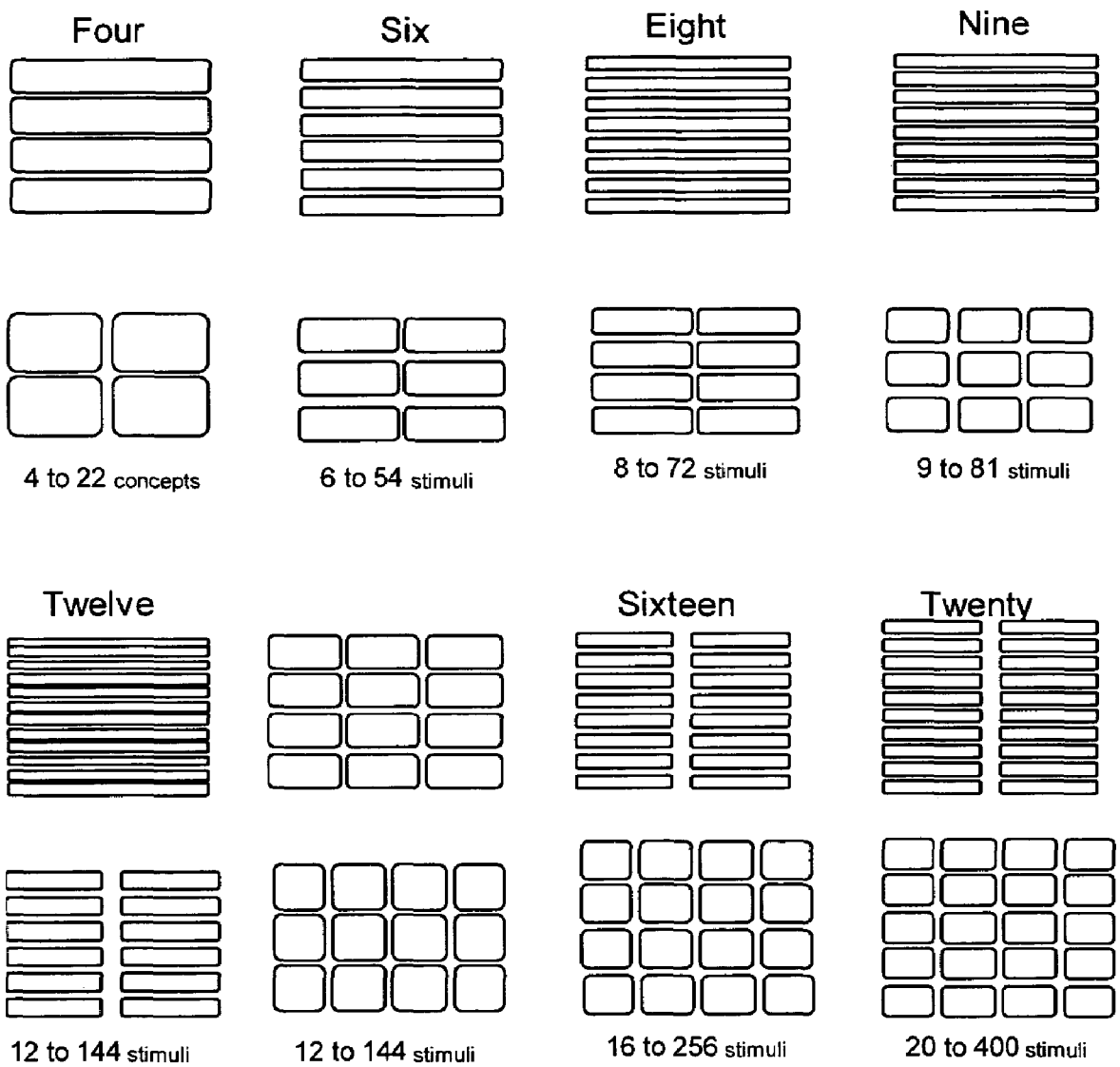
FIG. 11 illustrates a subset of the many possible visual layout options for the subset ranking screens.

The research study manager then selects the number of stimuli that will be presented on each ranking subset screen 112 and the visual layout. The number of stimuli in each ranking subset can range depending on the complexity of the stimuli, but will usually fall within the range of 4 to 20. The visual layout may present a list of stimuli or may array the stimuli in a grid. A subset of the many possible visual layout options is illustrated in FIG. 11.

First Round Ranking Subsets

In a preferred embodiment, the first step in a respondent interview is to randomize the order of the list of stimuli 122 so that a series of respondents will receive the stimuli in different orders so as to reduce the impact of stimulus order on the results.

Randomization is less important when working with a single respondent. The randomized order list 127 is then assigned to a grid of first round ranking subsets 132 according to the chosen configuration. This defines the first round of ranking subsets in which each stimulus is presented in at least one ranking subset. If the total number of stimuli results in a partially filled last ranking subset, that subset is filled out with low ranking stimuli from the results of early ranking subsets or the research manager may decide to present fewer than the full list of stimuli to each respondent.

Figure 10A:
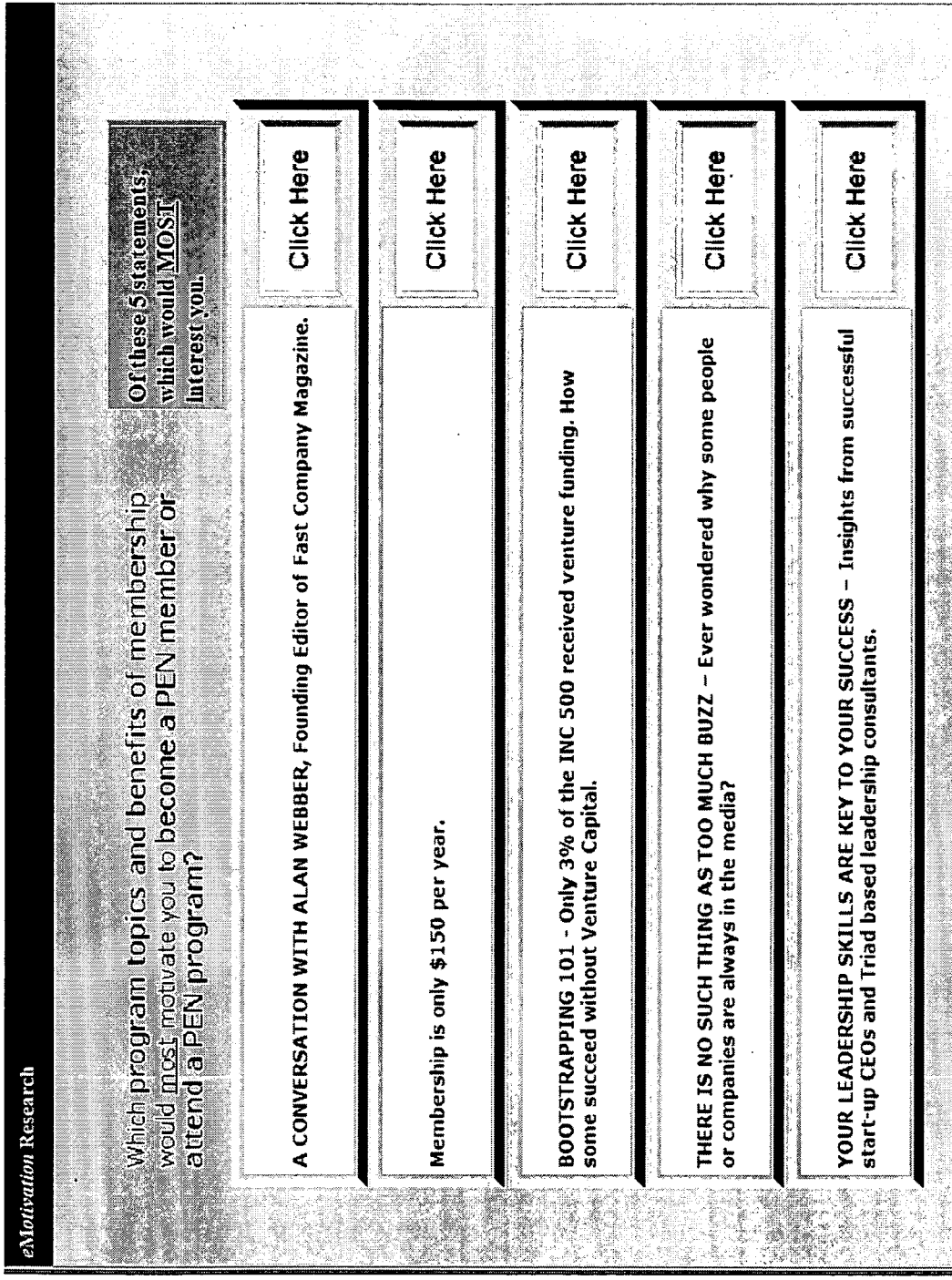
FIG. 10A illustrates one online implementation of the survey process configured for benefit statement or concept statement evaluations and 10B illustrates an implementation configured for style preference evaluations.

The survey computer program 120 presents the respondent with the first ranking subset on their computer screen 142 from a data storage device or server that is either directly connected to the respondent's computer or connected through a network or the Internet. The respondent chooses the one stimulus from the choices on the screen that best satisfies the motivating question. Examples of ranking screens are presented in FIGS. 10A and 10B. In a preferred embodiment, the choice is made by clicking on the stimulus or on a button beside the stimulus, but the present invention is not limited to that particular method of making a selection as those of skill in the art can readily associate numbers or text strings to the choices and receive input back through a keyboard or voice recognition system. Alternately, the respondent may be asked to indicate the rank among the stimuli on the screen by applying a number or by moving the stimuli into a visually ranked list.

Figure 2C:
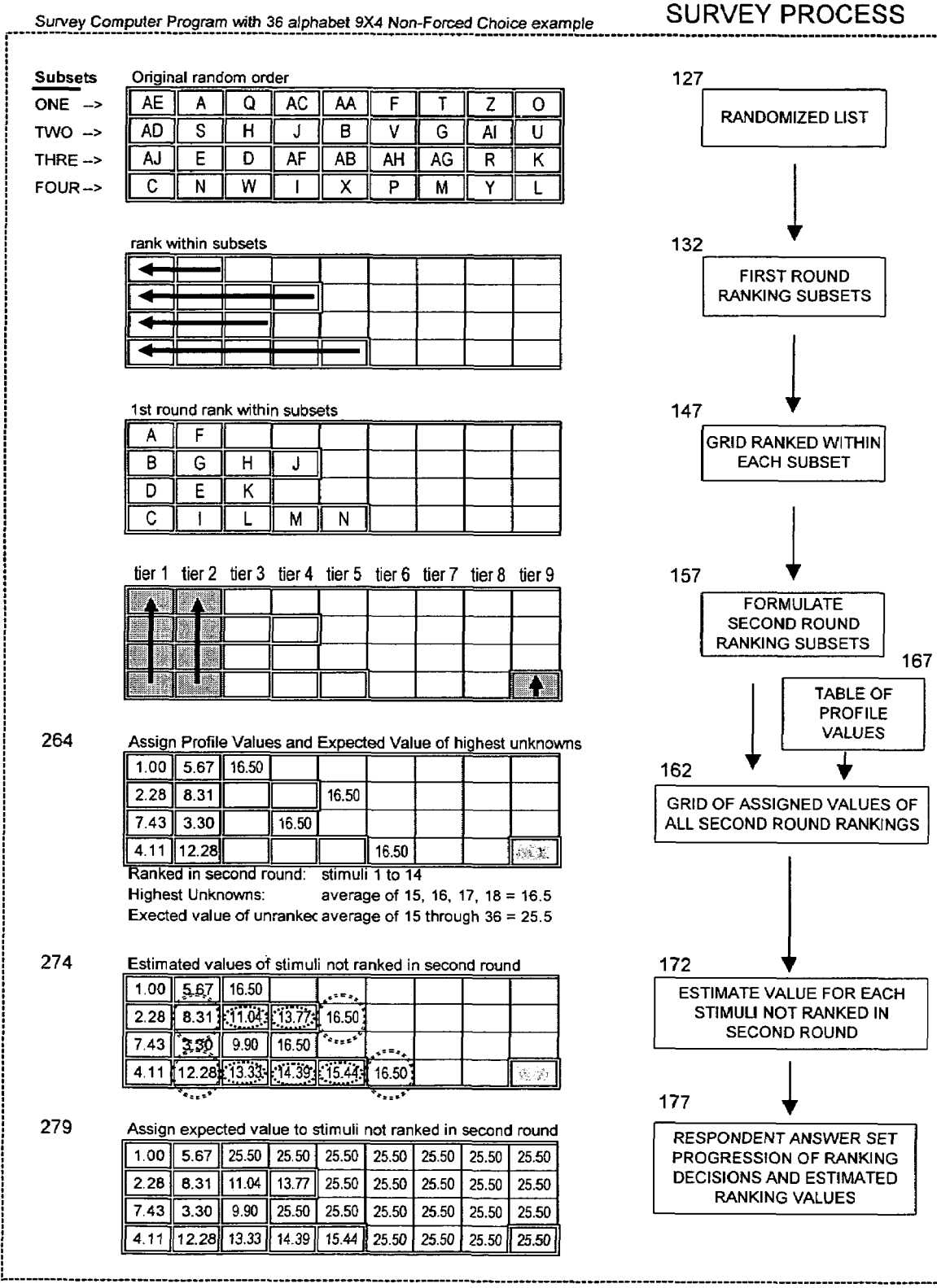
FIGS. 2C and 2D illustrate two configuration of the non-forced choice version of the respondent interview. Respondents only rank those items they judge are important and skip ranking those items they judge are not important. This improves the estimate of overall rank order by establishing the importance or non-importance of each item. Additionally, non-forced choice significantly shortens the average interview by more than half and further reduces respondent fatigue by not requiring respondents to rank items they feel are not important which improves the quality of response and completion rates.

The survey computer system records the response in a database 119 and then presents the same ranking screen minus the previously selected stimulus for the respondent to choose the one stimulus from the remaining choices that best satisfies the motivating question. This continues in an iterative fashion 137 until all but the last stimulus on the screen has been chosen. This establishes the rank order for this ranking subset 147. In a preferred embodiment, at any stage the respondent may conclude that none of the remaining choices on the screen is important relative to the motivating question and choose to move on to the next ranking subset FIG. 2C presents an example. This establishes a rank order of all stimuli that are considered important in the ranking subset. Stimuli that are considered unimportant remain unranked by the respondent and receive a low rank value in the assignment of values 279. Identifying choices as unimportant provides information content beyond merely ranking the choices as low on the list. Since the number of important versus unimportant stimuli may vary from screen to screen, identifying which are important across the screens aids in the determination of an accurate estimate of rank order across the full list of stimuli. A second benefit of identifying choices as unimportant is that avoidance of imposing unnecessary fatigue and frustration on a respondent by requiring a respondent to rank choices the respondent considers to be unimportant as it is understood that respondent fatigue is detrimental to accurately capturing preferences during the subsequent rounds of presented stimuli.

In a preferred embodiment of the ranking screen, the stimuli that are chosen by the respondent do not appear on the subsequent presentations of the ranking screen for that ranking subset and the remaining, yet-to-be-chosen stimuli remain in the exact same visual location on the screen as in the original presentation of the ranking screen. This maintains the visual location of each stimulus to minimize the respondent's mental effort to absorb and respond to the information on each successive presentation of the ranking screen. Alternative embodiments may continue to show the previously chosen stimuli, visually altered in some manner to distinguish the ranked from the unranked stimuli.

The survey computer program presents each ranking subset in this fashion until all first round ranking subsets have been ranked by the respondent and recorded in the database. The second round of ranking subsets are then formulated 157 according to the rankings in the first round.

Formulating Second Round Ranking Subsets

In formulating second round ranking subsets it is useful to visualize the results from the first round rankings as a grid FIG. 2A 247 in which each subset is a row presented in ranked order. The columns of the grid, perpendicular to the rows, stratify the response from the first round rankings. The first column or tier 1 of the grid includes the highest ranking stimulus from each first round ranking subset. The second column or tier 2 includes the second highest ranking stimulus from each round one ranking subset and so on.

As the first step in formulating the second round subsets, a second round subset, HIGH_ONE, is populated with the highest ranking stimuli from the first round subsets, tier 1 from the grid. If the number of stimuli in tier 1 overfills the HIGH_ONE subset, a second subset HIGH_TWO is populated with the remaining tier 1 stimuli and so on.

If the last second round subset in the HIGH_SERIES is not filled when the assignment of tier 1 stimuli is complete, the remaining open positions are filled with tier 2 stimuli.

The second step in formulating the second round subsets is to populate a second round subset, MID_ONE, with tier 3 stimuli. If the number of stimuli in tier 3 overfills the MID_ONE subset, a second subset MID_TWO is populated with the remaining tier 3 stimuli and so on. If the last second round subset in the MID_SERIES is not filled when the assignment of tier3 stimuli is complete, the remaining open positions are filled with tier 4 stimuli.

Figure 2D:
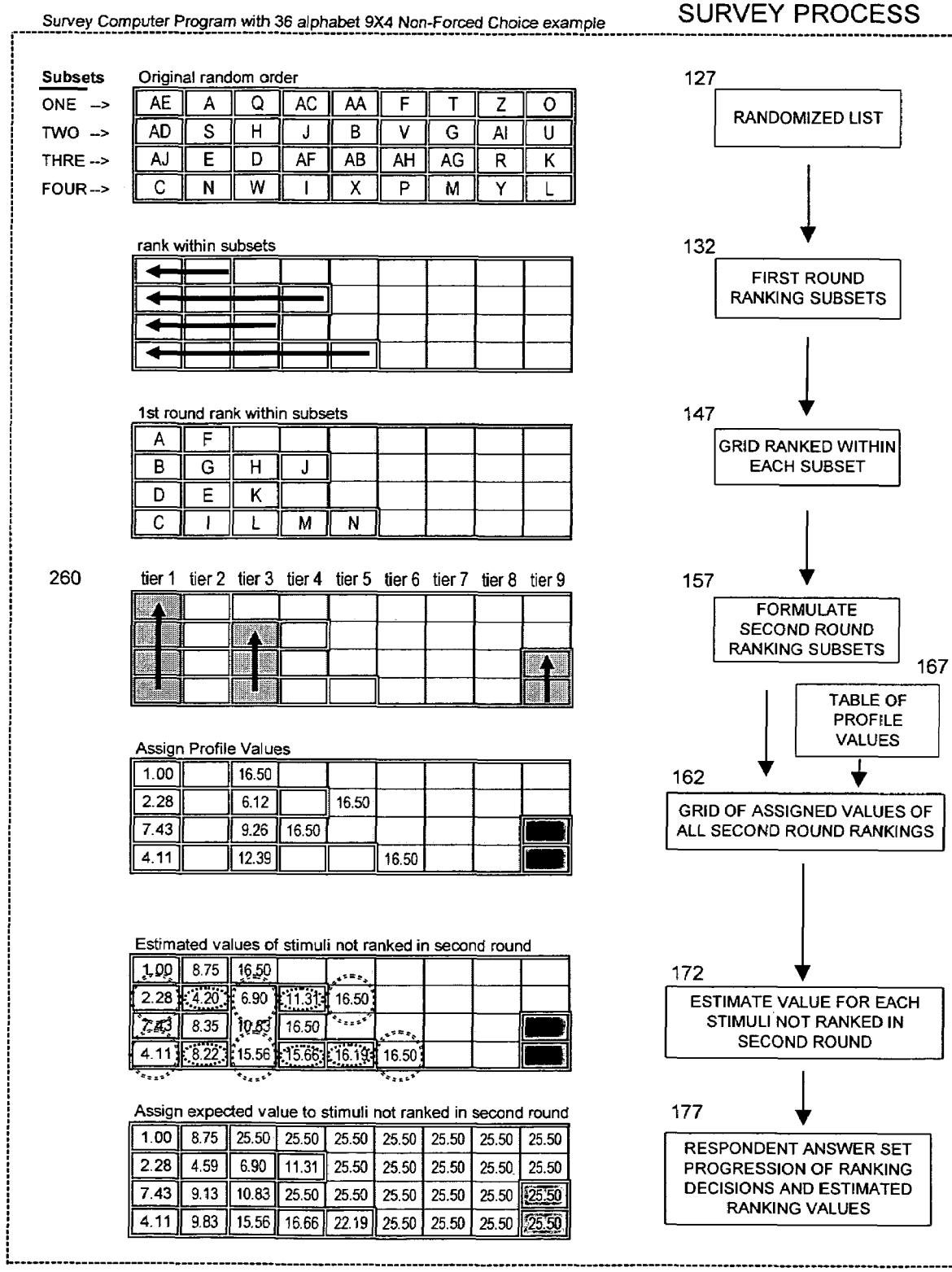

If the configuration of the study is such that HIGH_ONE requires all or most of two tiers to fully populate the subset, the study manager can choose to populate the HIGH_ONE subset with tier 1 and tier 2 stimuli as illustrated in FIG. 2B 258 or populate the HIGH_ONE subset with tier 1 and tier 3 stimuli as illustrated in FIG. 2D 260. The next tier below the HIGH_ONE subset is left unassigned while the MID_ONE subset is populated with the next two tiers or MID_ONE may also skip an intervening tier in the same manner 258.

In a preferred embodiment, the process intentionally does not include the stimuli in the skipped tiers in a second round ranking subset. Monte Carlo simulations of alternate second round survey configurations confirm that skipping tier 2 or tier 3 in the second round ranking, then estimating those stimuli rank values based on the second round ranking values for the stimuli above and below the unranked stimuli in the original subsets is almost as accurate and sometimes more accurate than including every tier in a second round ranking subset. The benefits of omitting tiers of stimuli from the second round subsets are 1) shortening the survey, 2) reducing respondent fatigue and thus 3) improving the completion rate and quality of respondent attention.

Further, the Monte Carlo tests confirm that omitting any second round subsets populated with stimuli below the MID_SERIES has no effect on the accuracy of estimating the rank order of the high ranking stimuli in the overall ranking and has only a minimal effect on the overall ranking accuracy if the bottom tier in the grid is assigned the average value for bottom tier stimuli and values between the bottom tier and the MID_SERIES ranking values are interpolated 273. Again, this shortens the survey and more importantly reduces the number of times a respondent must rank a stimulus a second time, thus improves respondent cooperation and quality of respondent attention.

Once the second round subsets are configured 157, the ranking subsets are presented to the respondent in the same iterative fashion 152 as the first round ranking subsets. The progression of respondent choices in ranking each second round subset are recorded in the database 119.

As splitting tier 1 values between two second round sets increases uncertainty and thus the range of possible true rank order values for the each of the rank order selections of the HIGH_SERIES second round subsets. The present invention can be executed without special modification in this case, but the accuracy will drop somewhat. In other words, Monte Carlo will provide average values for the expected overall rank order ranking, but these average values will be based on a distribution of true values that is less tightly distributed.

If the study configuration requires more than one HIGH_SERIES second round ranking subsets, then it is preferred that a single round three ranking subset is populated with the highest ranking stimuli from each of the HIGH_SERIES second round ranking subsets. This single third round ranking subset is presented to the respondent in the same fashion with the same motivation question to establish the rank among those stimuli. This increases the accuracy of the estimated rank order of stimuli at the very top of the overall ranking. Even with a round three, it is possible that the random distribution of the initial set of stimuli may have loaded one of the initial subsets with the most important, second most important and third most important stimuli. Execution of the first round ranking will place the second and third most important stimuli in the second and third tiers. A third round will not remedy that situation. The impact of such an aberrant case (all three highest stimuli in one round one subset) is mitigated by aggregating responses from a number of respondents.

In a preferred embodiment, the second round subsets and third round subset, if any, are presented to the respondent as a seamless continuation of the overall survey.

Assignment of Profile Values

Profile values 167 are the most likely ranking value in the order of the overall list of stimuli based on the subset and rank of the stimulus in the second round ranking. A unique set of profile values is determined for each survey configuration. Stimuli that are not ranked in a second round subset are not assigned a profile value. The rank order values of stimuli that are not ranked in a second round subset are estimated by interpolation in a step that follows The example of a survey in which the HIGH_ONE second round subset includes all the tier 1 stimuli serves to illustrate the need for and value of profile values. FIG. 5A illustrates this example. In the case presented, if a respondent can reliable report their opinions of the importance of stimuli in a ranking exercise, the survey should identify with 100% theoretical accuracy which stimulus is the #1 ranked stimulus in the overall list. That #1 stimulus will be ranked first in a first round subset and will be assigned to and be ranked first in the HIGH_ONE second round subset.

Identifying the second ranking stimulus in the overall list is less certain because in some portion of the occasions of assigning stimuli to first round subsets, the #2 stimuli will be assigned to the same first round ranking subset as the #1 ranking stimulus and will therefore not be assigned to the second round subset of the highest ranking stimuli, HIGH_ONE. Since the list of stimuli is randomized at the start of a survey, it can be assumed that on average for 25 stimuli presented 5 at a time, the #2 stimulus will be assigned to the same ranking subset as the #1 stimulus 4 in 24 surveys, about 16.7% of occasions. Further, in a percentage of occasions, the #3, #4 and #5 stimuli may be separately or in combination assigned to the same first round ranking subset. The mathematical probability is unique for each survey configuration. FIG. 5A presents a Monte Carlo estimation of the value for each tier position from the results of a full compliment of five second round ranking screens following five first round ranking screens of 5 stimuli each 503. This estimation has the advantage of visually presenting the distribution of values 504 as well as the mean 505, median and mode value in the overall list rank order. A preferred embodiment utilizes the mean value in the table of profile values 167, yet alternate embodiments may use the median, mode or other mathematically determined value. FIG. 5B presents tables of profile values for other representative survey configurations.

The proof of performance of the value of incorporation profile values in this invention will be presented below in the discussion of the measures of accuracy.

Answer Set Validity Measures

In a preferred embodiment, two additional steps 182/187 are included in this survey process to improve the quality of the output 192. A significant issue in opinion research is the concern that some respondents may not provide answers that accurately reflect their opinions due to the respondent's lack of attention or the inconsistency that may come from the respondent having vaguely held opinions. A preferred embodiment of the present invention includes two measures to ensure that each answer set is valid, i.e. each answer set is the considered opinion of an attentive respondent. The first of the two measures is a measure of internal consistency see FIGS. 3A/3B and the second is a measure of order bias see FIG. 4. If the results of these measures suggest that it is unlikely that the answer set is the considered opinion of an attentive respondent, the survey manager can choose to delete the respondent from the survey analysis thus eliminate a source of meaningless variance in the study results.

Internal Consistency Measure of Answer Set Validity

Figure 3A:
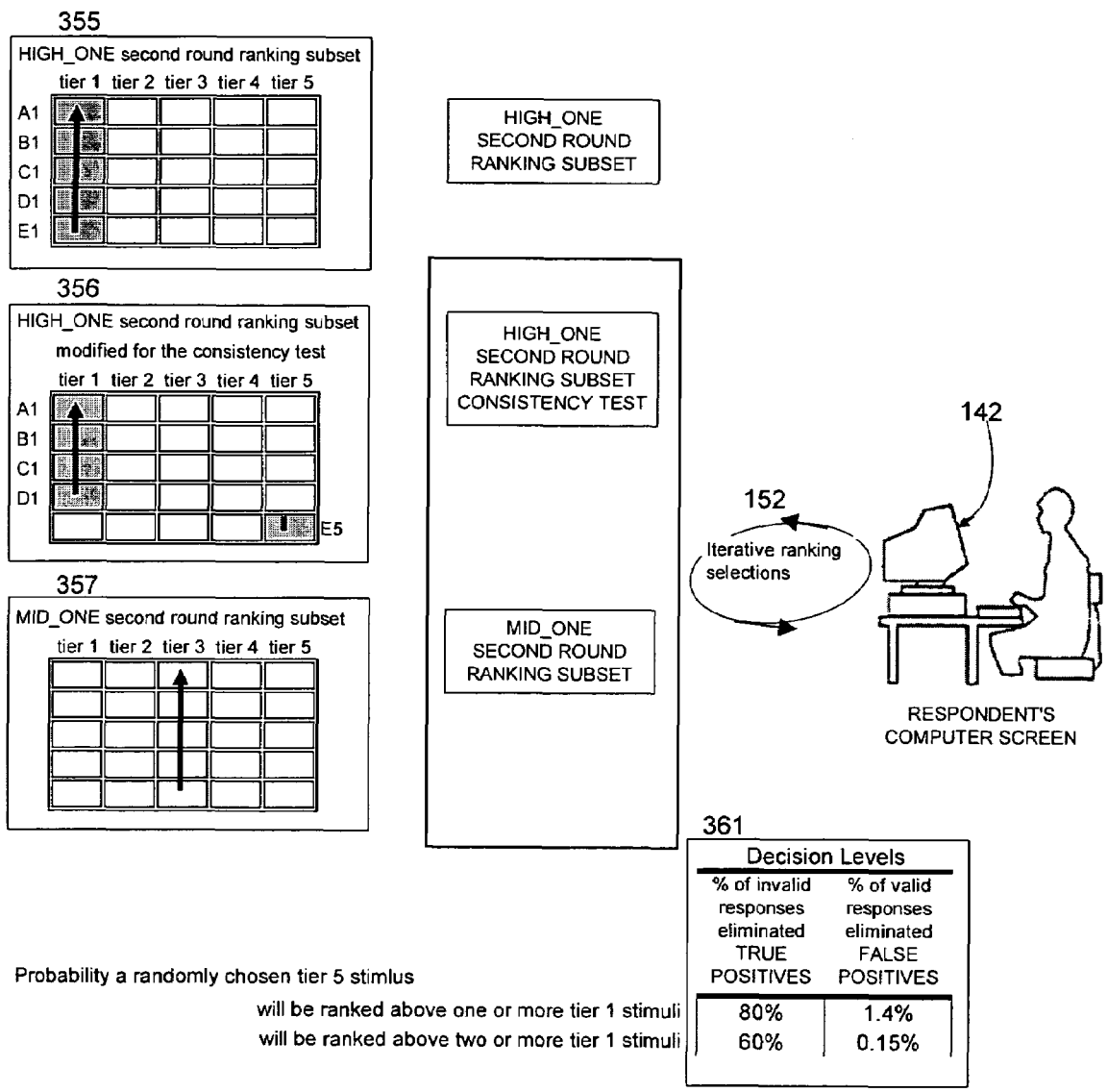

The measure of internal consistency requires that one of the HIGH_SERIES second round ranking subsets 157 be modified to include one or more low tier stimuli. FIG. 3A illustrates the example of a 25 stimuli ranking of 5 stimuli per ranking screen. The HIGH_ONE second round ranking subset is modified from the original composition 355 described earlier in the formulation of second round subsets 257 to a composition that includes four tier 1 stimuli and one tier 5 stimulus. There is no need to modify the MID_ONE second round ranking subset357 unless that is the second round subset chosen as the consistency check subset. If the MID_ONE second round ranking subset is chosen as the consistency check subset, it would be the subset modified in the manner just described. The intent of this comparison should not be obvious to the respondent since the respondent will not have previously seen a screen that includes the tier 5 stimulus 356-E5 with any of the tier 1 stimuli. Even when stimuli that appeared in the same first round ranking subset, such as the example in FIG. 3B, are displayed together, the internal consistency objective is not obvious because respondent attention is focused on the more obvious objective of eliciting the rank among the high ranking stimuli that in this example case came from four different first round ranking subsets. Yet in both examples, FIGS. 3A and 3B, the statistical probability can be readily calculated for the percent of occasions a low tier stimulus will be ranked above a tier 1 stimulus in the consistency check. Thus, the survey manager can select a decision rule that results in acceptable combination of levels of TRUE POSITIVES (the percent of inattentive respondents the rule will identify) and FALSE POSITIVES (the likely percent of valid respondents who will be eliminated because their valid answer set appears suspect).

In a preferred embodiment the decision rule that eliminates the highest percentage of TRUE POSITIVES (correctly identified inattentive respondents) is recommended because eliminating TRUE POSITIVES improves the quality of the analysis by reducing meaningless variance (noise) and because there is no reason the believe the FALSE POSITIVES are any different from the average respondent in the study. FALSE POSITIVES occur through random assignment of the variables to ranking subsets which is totally independent of the nature of the opinions of the respondent. Thus, the only negative in the elimination of the FALSE POSITIVES (good response sets misidentified by this consistency check) from the study is a small reduction in sample size. In the case of the FIG. 3A example, the sample size of valid respondents is reduced by 1.4% 361. The discriminating value of this consistency measure improves as the number of tiers between the low ranking stimulus and the comparison stimuli increases. Discrimination also improves when the low tier stimuli appeared in the same first round ranking subset as one of the tier 1 comparison stimuli, as is the case in the FIG. 3B example 376 subsets C and D. In this configuration 376, the first level of screening identifies 97% of the TRUE POSITIVE answer sets while the number of FALSE POSITIVES is only 0.6% of the valid respondents 381.

The consistency check illustrated in FIG. 3A has the adverse effect of leaving one of the tier one values out of the second round. This decreases the overall information collected about what is presumably one of the most important stimuli. This lack of information also impacts any interpolation that is done using the estimated value given to the tier one stimulus not included in a second round set. Thus, it is generally preferred to avoid a situation in which a tier one stimulus is not used in any of the second round sets. This situation becomes easier to avoid as the number of stimuli that can be presented to the respondent increases as this increases the number of tiers. With a larger number of tiers, the consistency check can be built into the MID_ONE second round set for example.

Order Bias Measure of Answer Set Validity

The second of the two validity measures is based on the level of apparent order bias expressed in the responses to the rank ordering exercises 187. Order bias occurs when respondents yield to the tendency to answer questions in a similar pattern unrelated to the merits of the question. Most often, order bias occurs when respondents are inattentive or have vaguely held opinions.

The present invention is uniquely structured to detect patterns of response since each survey is composed of a series of similarly structured ranking screens and since the order of the list of stimuli is randomized as the first step in each interview 122. In the preferred embodiment, after being randomly assigned into a subset and a position on the display screen presenting the stimuli, each stimulus remains in the same position on the display screen for the ranking exercise.

The probability of each pattern occurring across a given number of choice opportunities is calculated. An analysis of the respondent's pattern of response quickly indicates the probability this pattern could have occurred as a correct ranking of a set of randomly assigned stimuli. The research manager can select a decision rule which identifies an acceptable level of FALSE POSITIVES and have confidence that the difference between the level of apparent order bias and the expected level of FALSE POSITIVES is an approximation of the number of TRUE POSITIVES that will be eliminated by the decision rule. The level of FALSE NEGATIVES cannot be measured in this context; however, inattentive respondents who select positions at random which cannot be detected by the order bias measure will likely be detected by the internal consistency measure.

For example, one simple indicator of order bias is the number of occasions a respondent chooses the same position variable first in a given number of ranking sets. FIG. 4 illustrates this measure with two survey configurations. In a set of five ranking sets of five stimuli each 402, only 0.04% of respondents 417 should report the same position variable 402 in the first position 412 as they rank 407 each of the five subsets. Only 0.65% should report the same position variable as the top ranking variable in 4 of 5 ranking sets 417. Therefore, if the level of apparent order bias (in this case, the number of respondents who report 5 of 5 or 4 of 5 first position rankings) is significantly greater than the 0.69% of respondents estimate of FALSE POSITIVES in the study, the study manager can label those respondents as swayed by order bias with the knowledge that only 0.69% of total respondents on average will be excluded as FALSE POSITIVES. In the second example, a ranking of 30 stimuli in 5 subsets of 6 stimuli each422, the order bias measure is more sensitive due to the lower probability437 that a respondent will rank 427 all 5 or 4 of the 5 first position stimuli first in each subset432.

Further, since there is no reason to believe that those who are excluded as FALSE POSITIVES are different in any way from the average respondent in the study, excluding fewer than 1% of the valid respondents as FALSE POSITIVES should have negligible effect on the study conclusions. The number of TRUE POSITIVES excluded from a study due to order bias should be on average the number that exceeds the 0.69% expected FALSE POSITIVES. The number of TRUE POSITIVES will, of course, vary from study to study.

The sensitivity of the order bias measure increases as the number of stimuli per ranking set increases and as the number of ranking subsets increases. Therefore, the measure becomes more useful in larger studies.

While the preferred embodiment utilizes the pattern of ranking same position stimuli first in the ranking subsets, alternate embodiments may measure the frequency of repeat of any number of patterns or may utilize a measure of similarity among ranking order by position such as a correlation between ranking order and presentation position for a set of round one and round two responses from a particular respondent that is highly unlikely to have happened by chance. As with other quality tests for data, the risk of discarding suspicious data based on a false positive on a quality check is tolerable when discarded data from false positives has only a small impact on the number of respondents. Thus, it is on balance better to discard a small amount of legitimate data while removing the bulk of response sets created by "non-attentive respondents" as these response sets would have the effect of adding meaningless variance to the aggregated set of estimated rank order preferences for the group of respondents.

Measure of Performance

The present invention improves upon the performance of prior art solutions in the task of approximation of a respondent's rank order preference for a set of choices that cannot be readily displayed on a single display screen in terms of 1) ease of respondent interaction with the survey as evidenced by lower respondent fatigue, 2) flexibility to rank different types of stimuli in a single ranking, 3) capacity to rank a large number of stimuli, 4) robust solution for the persistent opinion research issues of yea-sayers, naysayers and outliers, and 5) capacity to validate the quality of individual respondent answer sets to reduce meaningless variance in the data set. It also provides a higher level of ranking accuracy in the task of correctly rank ordering a set of stimuli separate from the issues of respondent fatigue, the issue of yea-sayers and naysayers and the validation of answer sets.

Figure 6:
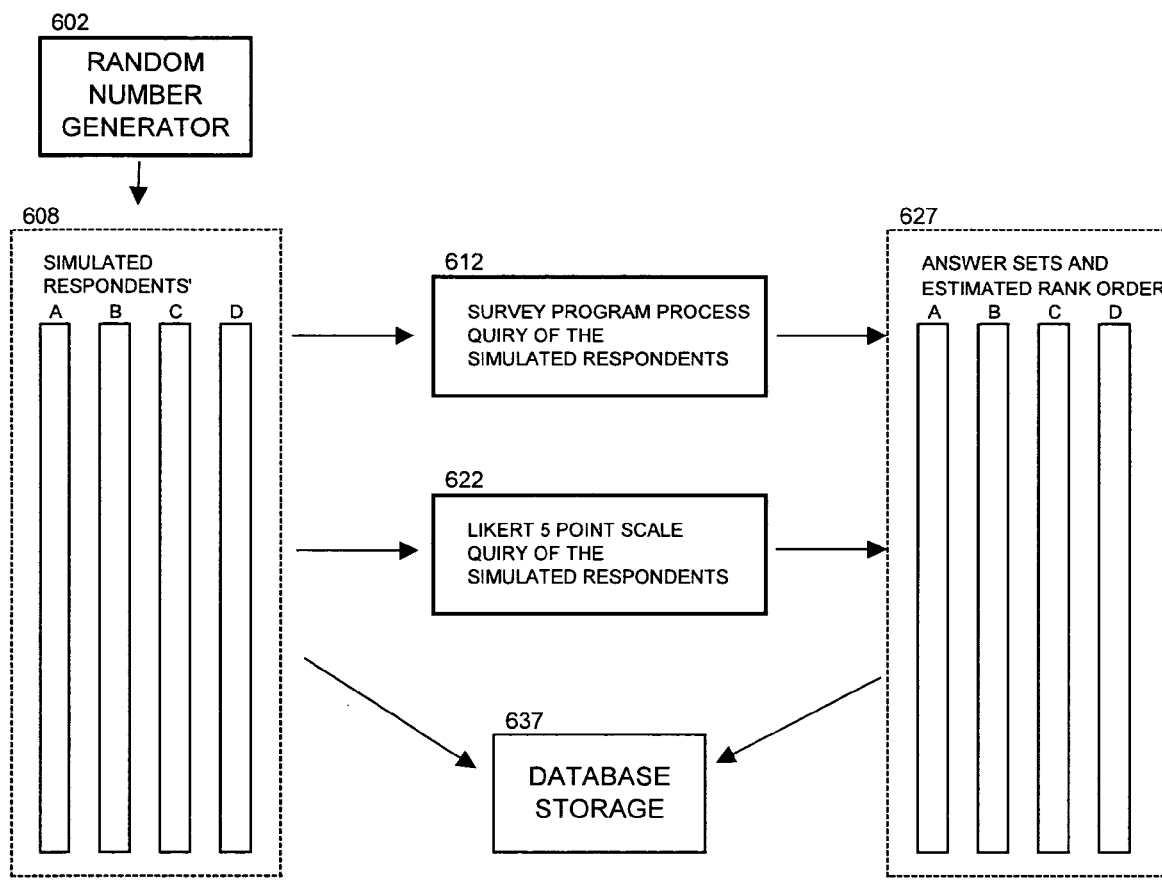
FIG. 6 illustrates the Monte Carlo model used to evaluate survey features and compare the ranking accuracy of the invention to prior art solutions.

To confirm the level of ranking accuracy, Monte Carlo simulations were conducted for a broad range of survey configurations. FIG. 6 illustrates the Monte Carlo process. A random number generator 602 created simulated respondent opinion sets 608 that specified the "true" rank order of a list of stimuli for that simulated respondent and the random order of presentation of the stimuli on the simulated survey. A model of the survey 612 then queried the simulated respondent utilizing the processes of the survey to construct an estimated rank order. In other words, the model looked at whether a respondent provided with a limited number of questions could provide sufficient information for the system to place the stimulus in the proper ranked order. In order to measure the correctness of the ranked order against the "true" order a known order was used. In this case, the known "true" rank order was the first 25 letters in the alphabet.

The resulting estimated rank order 627 and the simulated respondent's "true" order were stored in a database 637 for later comparison to determine the performance of the survey process. As a point of comparison, a Likert 5 point scale rank ordering was conducted on the identical set of simulated respondents 622. Likert scale ratings is the most commonly used current methodology to rank order lists of stimuli.

An obvious measure of accuracy of an approximation of a rank order relative to the true rank order is a correlation coefficient; however, since opinion surveys are generally conducted for the purpose of decision support, those relying on such surveys often place more importance on the ranking of stimuli at the top of the list, the most important stimuli, than on the order within the remainder of the list. Thus, it becomes important to construct a survey tool to ensure the best performance in correctly ranking the highest ranking stimuli among the choices. This emphasis requires also that the measure of accuracy be able to accurately compare the accuracy for a portion of the rank order list. While a correlation coefficient can assess the overall accuracy of a list, a correlation for a portion of a list is problematic.

In FIG. 7B correlation was used to evaluate the accuracy of five simulated respondents who each accurately provided Likert scale ratings of a ranking of 25 stimuli. The only difference among the four respondents 724 R1, R2, R3, R4 is a shift between rating a stimulus as a "1" or a "2" on the Likert scale. These modest changes among equally valid respondents reduced the correlation coefficient from 0.87 to 0.70 to 0.52. The correlation for the top 10 stimuli could not be calculated for respondent R4 since the respondent rated all stimuli in the top 10 the same with a rating of "1".

A correlation of a subset of the overall list, the top 10 items in the ranking for example, is not a useful measure for comparing the performance of a ranking of items because a correlation only measures the order among the values of the selected items. To illustrate, in the alphabet example if the respondent ranked the first ten items in the correct order of A B C D E F G H I J, the correlation would be 1.00 since the values exactly correspond with the rank. However, if the respondent mistakenly ranked A B C low in the ranking, yet still, by chance, ranked the next ten letters at the top of the ranking in order D E F G H I J K L M, the correlation would also be 1.00 726 R6 since the order of the values again exactly correspond with the rank even though the items included by the respondent were not the highest ranking items in the overall list.

Figure 7A:
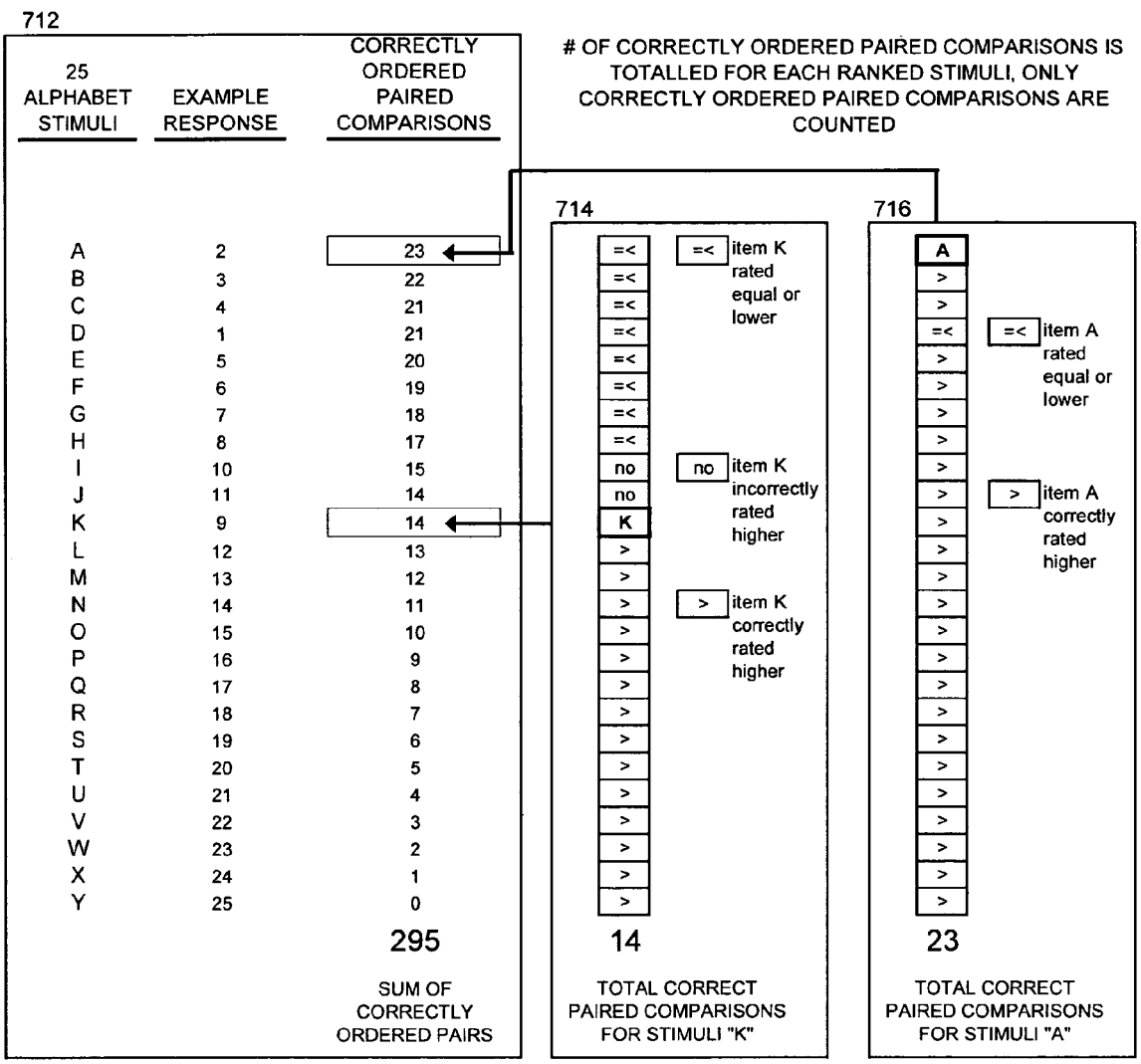

As an alternative to correlation for measuring the ranking accuracy for a highest ranking subset of the overall rank order, a sum of ordered pairs is presented here as a more robust measure that reflects not only the rank among items in a highest ranking subset but also reflects the correctness of the selection of items that appear in the highest ranking subset. FIG. 7A presents the calculation of the measure as the number of total paired comparisons correctly identified within a ranking or subset of a ranking and presents that number as a percentage of the total possible paired comparisons for that ranking or subset. This measure affords the flexibility to measure the accuracy of the rank order of items at the top of a ranking list. For example a rank order of 25 items can be represented as 300 paired comparisons 718. The rank order of the 10 items A B D E C F G H I J K L M N O P Q R S T U V W X Y would score a 298 out of 300 as this rank order incorrectly asserts that D is higher ranked than C and the E is higher ranked than C. However all other comparisons are correct A>B, A>D, A>E, A>C etc. B>D, B>E, B>C etc. D>E, D>F, etc. E>F etc.

In this manner, the number of correctly ordered paired comparisons is determined for each item in the list in terms of correctly ranking higher than other items on the list. For example in the illustration 714 item K is correctly shown ranked above 14 other items in the list. Item A 716 in ranked by this example respondent correctly above 23 other stimuli but is ranked incorrectly below stimulus D. Totaling the sum of correctly ordered pairs in this example would score 295 out of 300 712. Similarly, this ranking among the top 10 items would score 190 out of a possible 195 for a score of 97%. While this is a simplified scoring of ranking performance, it has the advantage that the accuracy of sections of a ranking can be compared among alternate methodologies and survey configurations.

Performance Comparisons of Likert Scale Ratings Versus the Present Invention

The percent of correctly identified paired comparisons measurement is applied in FIG. 8 to access the performance of Likert scales versus three stages in the process of the present invention, each using the 25 stimuli alphabet example. The results are shown for an individual respondent for clarity of presentation, yet the results are consistent with the totals determined from simulations of 13,131 iterations for each example and from other Monte Carlo simulations conducted in this investigation. Within the three examples of the present invention, the first level 822 shows the performance of the process applying integer ranking values (see steps 167 and 162 in FIG. 1). On the basis of identifying correctly ordered paired comparisons, the basic process outscores Likert scales 812 89% to 81% for the total ranking 872 and 91% to 82% for the ranking among the top 10 items 862.

The addition of profile values 832 improves the performance of the process accuracy to the level of correctly identifying 95% of the paired comparisons in the total tanking and 96% among the top 10 items.

The third process configuration 842 reduces the number of second round rankings from 5 to 2 to reduce the length of the survey and associated respondent fatigue. Those stimuli not ranked in a second round ranking subset are estimated by interpolation from the values in the tier above and below in the grid of second round rankings (Step 172 in FIG. 1). The combination of all assigned profile values, estimated ranking values and the specifics of the progression of ranking decisions together constitute the respondent answer set 177.

The illustration in FIG. 2A demonstrates this process with profile values from the 25 stimuli alphabet example. In this example, the interpolation step 272 estimates the value of the tier 2 stimulus from the second subset presented to the respondent in the first round The value of this tier 2 stimulus is estimated from the second round values of the tier 1 stimulus in that same first round subset, assigned a profile value of 2.18, and the value of the tier 3 stimulus in that same first found subset, with a profile value of 10.35. Assuming that the tier 2 value should be halfway between the tier 1 and tier 3 values results in an estimated value of the tier 2 stimulus of 6.27.

In this example the tier 5 stimuli are each assigned the average value of tier five stimuli in this configuration, value of 21.70. The ranking value of each tier 4 stimuli is then estimated based on the tier 3 profile value and tier 5 profile value of the stimuli in the same first round ranking subset. Survey configurations that have more items per ranking screen, hence more tiers, will have multiple tiers between tier 3 and the bottom tier as in the example of FIG. 2B. These multiple tiers are estimated by interpolation in the same manner. Thus, if there was two tiers between the third tier and the sixth and lowest tier, the stimuli in the sixth tier would be set to an average profile value for the sixth tier and the values for the $4^{th}$ and $5^{th}$ tiers would be assumed to be equally spaced within the range of profile values for the tier 3 and the tier 6 stimuli. Thus, the tier 4 stimuli would be estimated as equal to the tier 3 profile value plus $\frac{1}{3}^{rd}$ of the difference between the tier 3 profile value and the tier 6 profile value. Accordingly the tier 5 stimulus would be estimated to be at ⅔rds of the difference between the tier 3 profile value and the tier 6 profile value.

The ranking accuracy of the third option, profile values with estimated values (partial second round two inputs with interpolation) in FIG. 8 is 89% 842 of paired comparisons correctly identified in the total ranking and 95% of paired comparisons correctly identified for the top 10 ranked items 852. In a preferred embodiment this reduction in accuracy form the full second round ranking 832, 95% to 89% for the full stimuli list ranking accuracy measure and 96% to 95% for the top 10 ranking accuracy measure is well worth the benefit of the reduction in survey length and respondent fatigue, particularly given that the accuracy at the top of the list of stimuli is most important for most management decisions. Overall survey length is reduced 30% and the second round portion of the survey is reduced 60%.

Performance of Larger Survey Configurations

Figure 9A:
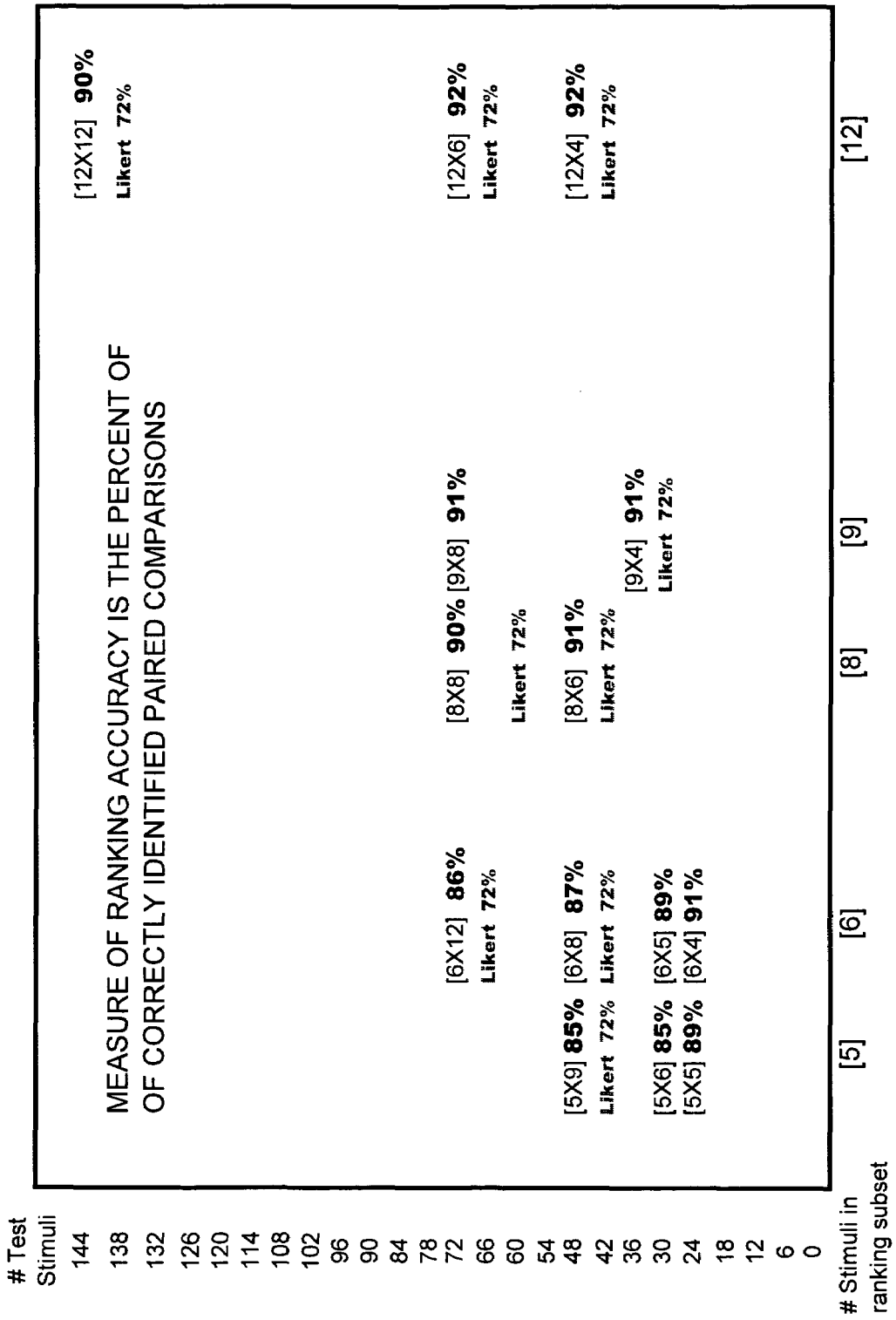
FIGS. 9A and 9B report Monte Carlo evaluations of a range of survey configurations up to 12×12, (144 stimuli). The level of overall accuracy improves slightly as the number of stimuli per ranking subset increases even as the number of second round rankings decreases as a percent of the total possible second round rankings. The accuracy of ranking the top 20 stimuli was consistent across the full range tested while the accuracy of Likert scale estimates of the top 20 stimuli rank declines as the number of stimuli increases.
Figure 9B:
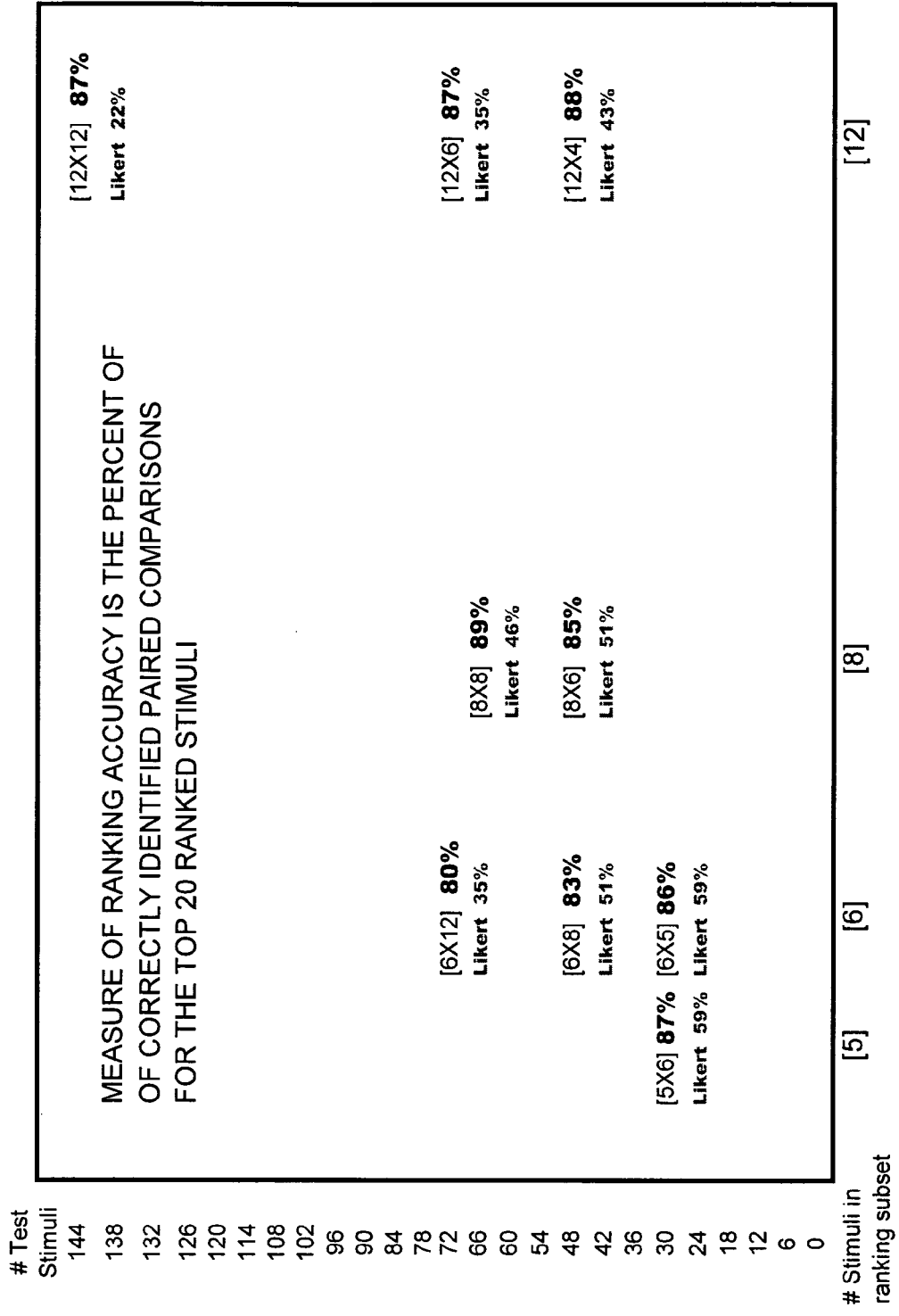

The primary example in this description of the present invention is an estimation of the rank order of 25 stimuli in a subset ranking screen configuration of 5 stimuli. Many survey applications will be configured to present more stimuli per ranking screen, from 4 or fewer up to 20 or more. To illustrate the effect on ranking accuracy of larger configurations, FIG. 9A and 9B report Monte Carlo simulations for configurations up to 12 stimuli per ranking subset screen ranking up to 144 stimuli. The 12×12 configuration, 12 stimuli per ranking screen presented as 12 first round ranking screens, achieved correct paired comparison identification accuracy of 90% for the full list and 87% for the top 20. The level of performance is consistent for each square grid rankings in which the number of stimuli per ranking subset equals the number of first round subsets, in this table 902 5×5, 8×8, 12×12, even though the proportion of second round subsets continues to decline in this example since each test has two second round subsets. The 5×5 configuration tests 40% of the second round subsets, the 8×8 tests 25% and the 12×12 tests only 17%. Thus, the accuracy improves as the number of stimuli per ranking subset screen increases.

Within each ranking screen stimuli size, the accuracy improves as the number of stimuli declines. For the 12 stimuli ranking screen size, the ranking accuracy for the full list of stimuli is 92% for the tests of 48 stimuli and 72 stimuli. Accuracy declines slightly to 90% for the test of 144 stimuli.

Given these relationships between the number of stimuli per ranking screen and the total number of stimuli in the test, one would expect greater accuracy from a ranking of 72 stimuli if the test could be configured as a 12×6 rather than a 6×12. This is indeed the case. The 12×6 test configuration performed at 92% overall accuracy versus the 6×12 at 86% accuracy. The choice of configurations; however, must also take into account the complexity of the stimuli. Can 12 of these stimuli be effectively displayed on one screen and can a respondent comfortable rank 12 of these stimuli in one subset ranking? The present invention provides options for the study manager to effectively address the parameters of the research need over a broad range of number of stimuli and complexity of the stimuli.

Performance Comparisons of Likert Scale Ratings Versus the Present Invention for Larger Survey Configurations The importance of recapping the accuracy of Likert scales in comparison to the present invention in the task of estimating the rank order of a list of stimuli is that Likert scales is currently the most commonly used opinion research structure to gather the opinions of respondents for ranking exercises and as the key data input for opinion research statistical analysis.

Above 20 to 25 stimuli in a total ranking list, the selection of Likert sating scale response patterns used in this investigation settles down to correctly identifying about 72% of paired comparisons for the entire list. This assessment was based of a sampling of typical patterns of responding to 5 point rating scale rating questions from near yea-sayers to naysayers and several options in between. This accuracy level stays consistent throughout the range tested up thorough a sample size of 144.

In the task of correctly identifying the rank order of the top 20 items in each list, Likert scales correctly identifies about 59% of the paired comparisons among the top 20 items for a sample size of 30 stimuli. Likert scale ranking accuracy declines to 35% of correctly identified paired comparisons for a sample of 72 stimuli and declines to an accuracy of 22% for a sample size of 144.

In the task of rank ordering a list of stimuli, the present invention clearly outperforms the accuracy of Likert scales for samples of 25 or 30 for the total list accuracy and the accuracy for the top items in a list. The advantage in the accuracy of rank ordering the top items in a list increases as the sample size increases.

Performance of a Non-Forced Choice Embodiment

For clarity of presentation, the examples presented to this point have been the forced-choice structure which requires the respondent to choose stimuli from the successive ranking screens until the full ranking of the subset has been determined. The option of a non-forced choice structure was described in the FIRST ROUND RANKING SUBSETS section above. Structuring a survey as a non-forced choice ranking significantly reduces the number of choices each respondent must make thereby further reducing the demands on the respondent and the associated respondent fatigue.

Structuring a non-forced choice survey requires a modification to the value estimating procedure 172 since some stimuli will not be ranked by a respondent and since this number will vary among respondents. In the earlier described preferred embodiment for the forced choice process, the ranking values for the lowest ranking tier stimuli are estimated as the average ranking value for the number of lowest ranking stimuli equal to the number of first round ranking subsets. Alternatively, the value can be more accurately estimated mathematically or by the application of a Monte Carlo simulation.

In a non-forced choice ranking the values of all unranked stimuli are estimated to be the average ranking value for all of the unranked stimuli making the assumption that the respondent delineated their preference between the important ranked items and the unimportant unranked items. In the example presented in FIG. 2C, the value for the 22 unranked items, presumably the lowest ranking 22 items for this respondent, is calculated as the average of ranks of items 15 through 36 for an average value of 25.5 279. This ranking value estimate for unranked items in the first round ranking of subsets 132 will vary among respondents as the number of unranked items varies.

While the value estimated for the unranked stimuli applies to all unranked stimuli because the respondent provides no information to indicate which among the unranked should be higher in rank, nonetheless it can be assumed that the unranked item just below the last ranked item has a ranking that is higher than the average that will be assigned to it. This embodiment estimates the value of that highest unranked stimuli in each subset, even though the identity of that stimuli cannot be determined, so that value can provide a more accurate reference point to estimate the value of stimuli ranked in the first round ranking but not included in a second round ranking. The six open boxes in the "Assign Profile Values" grid 264 in the example illustrate those values to be estimated. For the purposes of that estimate only, the value of the highest unranked item in each first round ranking subset is estimated by assuming that these positions in the grid are occupied by the four highest ranking stimuli among the unranked. In the example case these four items would have rank values of 15, 16, 17, & 18 for an average of 16.50. This value then is used to estimate the value of the items not ranked in a second round ranking 274. Alternatively, the value can be more accurately estimated mathematically or by the application of a Monte Carlo simulation. In the final estimation stage, all of the unranked items from the first round ranking are assigned the average unranked value 279.

FIG. 13 illustrates the accuracy performance for a forced choice 36 stimuli 9 stimuli per ranking screen study versus conducting the same study in a non-forced choice structure. The example respondent in this study ranked six subsets of 9 stimuli, in the process made 48 respondent choices, to achieve a top 10 stimuli rank accuracy of 97% and total list accuracy of 92% 1310. The two non-forced choice examples achieved the same high level of accuracy for the top 10 stimuli and accomplished this with only 22 choices from the respondent 1320 1330. While this performance is representative, respondent ranking accuracy will vary as respondents choose to rank more of fewer stimuli in a particular survey. The ranking accuracy for the total list is lower for the non-forced choice structure, 62% accuracy in the examples 1320 1330, yet as a decision tool for which accuracy at the top of the list of stimuli is most important, the advantage of respondent goodwill, not forcing respondents to make choices among options they feel are not important, and the advantage that more extensive lists of stimuli can be evaluated, make non-forced choice the preferred structure for many applications.

Monadic Test of Comparison Sensitive Variables

A comparison sensitive variable is one for which the better answer is obvious to a respondent if they see alternative values of the variable in a direct comparison. Price point is the classic comparison sensitive variable. Given a choice between two or more price alternatives, respondents will most often choose the lowest price because it is the logical choice. If, however a sample of respondents are presented one price and ask to rank its influence on their purchase decision and a second comparable sample of respondents is presented another price point and asked to evaluate it in a similar fashion, a more objective evaluation of the importance of price can be determined. While price point is the classic comparison sensitive variable, many other variables would benefit from the objective measure of a monadic test.

An embodiment of the present invention is well suited to evaluate comparison sensitive variables by dividing respondent samples into comparable test cells and including one value or variation of the comparison sensitive variable in each test cell. The number of test cells is limited only by sufficient sample size for an acceptable level of statistical reliability in each test cell. FIG. 12 illustrates an example of the present invention adapted for monadic testing in which four values of the comparison sensitive variable are each evaluated in a comparable test cells within the total respondent sample. Each respondent evaluates only one value $1202$ $B_1$, $1207$ $B_2$, $1212$ $B_3$, $1217$ $B_4$ of the comparison sensitive variable.

The test is non-obvious to the respondent, hence more objective, since the comparison sensitive variable is only one of a list of stimuli. The remaining stimuli serve as a framework to evaluate the relative performance of the comparison sensitive variable values. Further, the remaining stimuli can constitute a valid attribute or motivating factor ranking lest concurrent with the comparison sensitive variable test. In a preferred embodiment the first round subset placement and visual position of the monadic variable is held constant across all respondents to avoid any variance that may be introduced due to effect of position. The presentation order of the remaining list of stimuli will be randomized for each respondent.

Monadic testing of variables is a standard opinion research practice. One of the advantages of the implementation of monadic testing in a survey conducted in accordance with the present invention is the solid benchmark framework that the ranking of the full list of stimuli provides and the fact that the benchmark is itself a valid concurrent test.

Single User Applications

While the present invention can be used as an effective tool to determine the opinions of respondents in a survey, the present invention can also serve as an effective tool to profile the priorities or to elicit taste or design preferences of an individual relative to an issue or a design task. The present invention may serve as a tool to assist individuals to better understand their own evaluation of the relative importance of factors surrounding an issue, a purchase decision or the design of a custom built product that involves tradeoffs or fashion decisions such as choosing a home, a wardrobe, planning one's retirement or designing a website. A survey of a single user may be used as a formalized needs and issues interview process to help the provider of a service or product to better understand the needs and desires of their prospective customer. Further, creating an estimated rank order ranking in accordance with the present invention may be used as an alternative method to gather psychological or job related attitude information that are now gathered as a series of multiple choice or rating scale questions.

Utilizing the Present Invention in a Gap Analysis

An opinion research gap analysis measures one issue from two or more perspectives to identify a gap between the measures which may signify a market opportunity or a communication issue. The structure of the present invention is well suited to such analyses in that the same set of stimuli may be evaluated versus different motivation questions to address the issue from different perspectives. One example of a gap analysis would be a comparison of the "desirability" of a set of attributes versus the "availability" of those attributes in the market. The set of attributes would be the stimuli in this test to be evaluated relative to a "desirability" motivating question and an "availability" motivating question in two rank ordering exercises.

Combined with other Information Gathering Methodologies

While the present invention has been presented in the context of a methodology which leads to a rank ordering of a set of stimuli, it is fully intended that the present invention can function as one step in a larger process. The present invention may be the first step in a process which uses the output of the process of the present invention as the input for further analysis such as factor analysis, cluster analysis, segmentation analysis, perceptual mapping or any number of other analysis procedures. Further, the process of the present invention may be preceded by a screening of stimuli by respondents to ensure that only relevant stimuli are included in the set of factors to be ranked.

Development of a Lifestyle, Attitude or Preference Index

The unique strength of the capacity of the present invention to accommodate a large number of stimuli and to validate the quality of each answer set makes processes performed in accordance with the present invention high performing choices to collect lifestyle, attitude or preference data as the first step in creating a descriptive consumer index. Such a lifestyle, attitude or preference index may be more predictive of consumer preferences than the currently available options.

Alternative Embodiments

The explanation of the preferred embodiment of the present invention presents a use of a respondent using a traditional personal computer or a personal computer connected to a network or to a remote server through the internet. The present invention is not limited to those specific devices. The present invention can be used with network terminals (so called dumb terminals) without local mass storage devices or processors. The present invention can be implemented using television screens as long as there is a path for communicating selection choices. Web TV and various services provided through the television by hotels are illustrative of this type of system. The present invention can also be implemented on smaller perhaps portable devices such as PDAs (personal digital assistants) or cell phones. Obviously, a small display screen is likely to reduce the number of choices that can be presented at one time and may not be suitable for showing stimulus that requires large images, but the present invention can be used for appropriate stimulus sets on any device capable of presenting the stimulus and receiving a response. A telephone without any display at all may be appropriate for implementing the present invention if the stimulus is audio without any visual component.

The phrase respondent's rank order preferences or variations of that phrase bring to mind a ranked order that starts with the respondent's most preferred choice or most favorite choice then the second most favorite choice and so forth.

When properly understood and as used in the claims, this is the respondent's most preferred choice in response to the underlying question and not necessarily the respondent's abstract preferences. For example, the question may be--what are the characteristics of a customer service organization that would make you consider taking your business to another company? The respondent would reply first with the stimulus that represents the characteristic that is the least desirable to that respondent as a characteristic for a customer service area. If the question presented to the respondent is to provide the most important reason for voting for a certain candidate, then the ranked order of reasons might include positive attributes for the candidate or the candidate's party and negative attributes attributed to the opponent or the opponent's party. These responses are "preferences" only in the context of a preferred answer to the question.

One of skill in the art will recognize that alternative embodiments set forth above are not universally mutually exclusive and that in some cases alternative embodiments can be created that implement two or more of the variations described above. In a like manner, one of skill in the art will recognize that certain aspects of the present invention can be implemented without implementing all of the teachings illustrated in the various disclosed embodiment. Such partial implementations of the teachings of the present invention fall within the claimed subject matter unless the claims are explicit in calling for the presence of additional elements from other teachings. Moreover, the scope of the present invention covers the range of variations, modifications, and substitutes for the system components described herein, as would be known to those of skill in the art.

The legal limitations of the scope of the claimed invention are set forth in the claims that follow and extend to cover their legal equivalents. Those unfamiliar with the legal tests for equivalency should consult a person registered to practice before the patent authority which granted this patent such as the United States Patent and Trademark Office or its counterpart.

What is claimed is:

1. A method for creating an estimate of a respondent's rank order preferences for at least a portion of a set of N stimuli where N is a positive integer equal to R multiplied by S, the method comprising:
  A) presenting to a respondent a subset of R stimuli selected from the set of N stimuli;
  B) receiving from the respondent, a set of rank order preferences for the presented subset of R stimuli;
  C) repeating A and B until all N stimuli have been presented in S subsets of R stimuli and S sets of rank order preferences have been received for the sets of R stimuli;
  D) presenting a set H comprised of the highest ranked stimuli from each of the previously presented S subsets;
  E) receiving from the respondent, a set of rank order preferences for the presented set of stimuli in set H;
  F) associating each of the rank order preferences for the presented set of stimuli from set H with a value representative of an estimated overall rank order preference for a stimuli receiving a particular ranking in set H for a set of N stimuli presented in S subsets of R stimuli;
  G) presenting a set T comprised of the third highest ranked stimuli from each of the previously presented S subsets;
  H) receiving from the respondent, a set of rank order preferences for the presented set of stimuli in set T;
  I) associating each of the rank order preferences for the presented set of stimuli from set T with a value representative of an estimated overall rank order preference for a stimuli receiving a particular ranking in set T for a set of N stimuli presented in S subsets of R stimuli;
  J) using the values associated in steps F and I with the highest and third highest ranked values of each of the original subsets to estimate the overall rank order preference for any stimuli originally ranked second highest in each of the S subsets for second ranked stimuli lacking an estimated overall rank order preference; and
  K) outputting the respondent's estimated overall rank order preferences for at least a portion of the set of N stimuli.

2. The method of claim 1 further comprising the steps of:
  J2) in addition to presenting the set H of the highest ranked stimuli, and the set T of the third highest ranked stimuli, present additional sets comprised of similarly ranked values and receive from the respondent additional sets of rank order preferences for the presented set of stimuli in each set until receiving a set of sets of rank order preferences for stimuli initially ranked 1, 3, 5, up to Rth in the original subsets of R stimuli;
  J3) in addition to associating each of the rank order preferences for the presented set of stimuli from sets H and T with a value representative of an estimated overall rank order preference for a stimuli receiving a particular ranking in that set for a set of N stimuli presented in S subsets of R stimuli, associating each of the rank order preferences for the presented set of stimuli from the remaining sets with a value representative of an estimated overall rank order preference for a stimuli receiving a particular ranking in that set for a set of N stimuli presented in S subsets of R stimuli; and
  J4) in addition to using the values associated in steps F and I with the highest and third highest ranked values of each of the original subsets to estimate the overall rank order preference for each of the stimuli originally ranked second highest in each of the S subsets; estimate the overall rank order preferences of other stimuli given an even number rank order preference when the respondent viewed the initial set of S subsets through use of the overall rank order preference values associated with the next higher and next lower ranked stimuli from the original subset; wherein the step of Outputting the respondent's estimated overall rank order preferences for at least a portion of a set of N stimuli includes outputting the respondent's estimated overall rank order preferences for all N stimuli.

3. The method of claim 1 further comprising associating an average overall rank order preference to each of the lowest ranked stimuli for use in estimating the overall rank order preference of each of the second lowest ranked stimuli from the original S subsets of stimuli based on the estimated overall rank order preference of the lowest and a higher ranked stimuli from the original S subsets of stimuli whereby the respondent is not asked to provide a set of rank order preferences for the set of lowest rank stimuli thus reducing requirements for respondent input to create an estimate of the respondent's overall rank order preferences of N stimuli.

4. The method of claim 1 wherein the step associating each of the rank order preferences for the presented set of stimuli from set H with a value representative of an estimated overall rank order preference for a stimuli receiving a particular ranking in set H for a set of N stimuli presented in S subsets of R stimuli uses estimated overall rank order preferences derived from Monte Carlo simulations.

5. The method of claim 1 wherein the step associating each of the rank order preferences for the presented set of stimuli from set H with a value representative of an estimated overall rank order preference for a stimuli receiving a particular ranking in set H for a set of N stimuli presented in S subsets of R stimuli uses estimated overall rank order preferences than include non integer values.

6. The method of claim 1 wherein S is less than R such that presenting all of the stimuli given the highest rank in the S original subsets presents less than R stimuli to the respondent, the method further characterized by: set H consists of S stimuli given the highest rank order preferences by the respondent from the original S subsets and (R minus S) other stimuli that were not given the highest rank order preference by the respondent from the original S subsets.

7. The method of claim 1 wherein the estimate of the respondent's rank order preferences for at least a portion of N stimuli is to be combined with the estimates of other respondent's rank order preferences for at least a portion of N stimuli, the method further characterized by altering the order of the N stimuli so that the set of respondents are not all presented with the stimuli in the same order in the same S subsets.

8. The method of claim 1 wherein the estimate of the respondent's rank order preferences for at least a portion of N stimuli is to be combined with the estimates of other respondents' rank order preferences for at least a portion of N stimuli, the method further characterized by randomizing the order of the N stimuli for each respondent so that the first R stimuli presented in the first subset is not consistent across the set of respondents.

9. The method of claim 1 wherein the steps A and B are further characterized by initially presenting R different stimuli to the respondent and then removing each selected choice as a possible choice for subsequent selection until only two choices remain then recording the next selection as the second lowest ranked choice and recording the unselected value as the lowest ranked choice.

10. The method of claim 1 wherein the steps A and B are further characterized by allowing the respondent to indicate that the remaining unselected choices are unimportant and marking the unselected stimuli to indicate that the respondent deemed them unimportant.

11. The method of claim 1 wherein the set of respondent's estimated overall rank order preferences for at least a portion of the set of N stimuli is not aggregated with a set of estimated overall rank order preferences for at least a portion of the set of N stimuli for a second respondent if the second respondent's responses fail a screening test for order bias.

12. The method of claim 11 wherein the screening test for order bias fails the second respondent's responses when the respondent chooses X different stimuli sharing a same relative position in different presented subsets to be the highest ranked stimulus for that subset and the number X is above an acceptance threshold.

13. The method of claim 11 wherein the screening test for order bias fails the second respondent's responses when the second respondent's rank order preferences for various presented sets of stimuli indicates a correlation between second respondent's sets of rank order preference rank and a relative position of the stimuli within the presented set of stimuli, and the chance of that correlation occurring randomly is less than acceptance threshold Y.

14. The method of claim 1 wherein the stimuli are exclusively audio stimuli and the respondent provides sets of rank order preferences through use of a telephone keypad.

15. The method of claim 1 for creating an estimate of a respondent's rank order preferences for at least a portion of a set of N stimuli further including an internal consistency check wherein:
the set of H comprised of the highest ranked stimuli from each of the previously presented S subsets includes at least one lowest ranked stimulus from one of the previously presented S subsets and the method includes discarding the respondent's responses if the respondent's set of rank order preferences for the presented set of stimuli in set H ranks the previously lowest ranked stimuli above at least one of the previously highest ranked stimuli.

16. The method of claim 1 for creating an of a respondent's rank order preferences for at least a portion of a set of N stimuli further including an internal consistency check wherein:
the set of H comprised of the highest ranked stimuli from each of the previously presented S subsets includes at least one lowest ranked stimulus from one of the previously presented S subsets and the method includes discarding the respondent's responses if the respondent's set of rank order preferences for the presented set of stimuli in set H ranks the previously lowest ranked stimuli above at least two of the previously highest ranked stimuli.

17. A method for creating an estimate of a respondent's rank order preferences for at least a portion of a set of N stimuli where N is a positive integer equal to R multiplied by S, the method comprising:
A) presenting to a respondent a subset of R stimuli selected from the set of N stimuli;
B) receiving from the respondent, a set of rank order preferences for the presented set of R stimuli;
C) repeating A and B until all N stimuli have been presented in S subsets of R stimuli and S sets of rank order preferences have been received for the sets of R stimuli;
D) presenting a set H comprised of the highest ranked stimuli from each of the previously presented S subsets;
E) receiving from the respondent, a set of rank order preferences for the presented set of stimuli in set H;
F) associating each of the rank order preferences for the presented set of stimuli from set H with a value representative of an estimated overall rank order preference for a stimuli receiving a particular ranking in set H for a set of N stimuli presented in S subsets of R stimuli;
G) presenting a set HH comprised of the second highest ranked stimuli from each of the previously presented S subsets;
H) receiving from the respondent, a set of rank order preferences for the presented set of stimuli in set HH;
I) associating each of the rank order preferences for the presented set of stimuli from set HH with a value representative of an estimated overall rank order preference for a stimuli receiving a particular ranking in set HH for a set of N stimuli presented in S subsets of R stimuli;
J) presenting a set F comprised of the fourth highest ranked stimuli from each of the previously presented S subsets;
K) receiving from the respondent, a set of rank order preferences for the presented set of stimuli in set F;

L) associating each of the rank order preferences for the presented set of stimuli from set F with a value representative of an estimated overall rank order preference for a stimuli receiving a particular ranking in set F for a set of N stimuli presented in S subsets of R stimuli;

M) using the values associated in steps F and I with the second highest and fourth highest ranked values of each of the original subsets to estimate the respondent's overall rank order preferences for any stimulus originally ranked third highest in each of the S subsets for third ranked stimuli lacking an estimated overall rank order preference; and N) outputting the respondent's rank order preferences for at least a portion of the set of N stimuli.

18. A method for preparing an estimate of a respondent's rank order preferences for a set of stimuli, the method comprising:

A) identifying a motivational question;

B) identifying a list of factors relevant to the motivational question and representing the factors as a set of N stimuli;

C) identifying R, which is a maximum number of stimuli of the type of stimuli representing the factors in the set of N stimuli that can be presented to a respondent for obtaining the respondent's rank order preferences for those R stimuli;

D) selecting a first round presentation sequence consisting of a set of S subsets of not more than R stimuli to be presented to the respondent for obtaining the respondent's rank order preferences for the stimuli in each subset;

E) selecting a second round presentation sequence consisting of a number of second round subsets of not more than R stimuli to be presented to the respondent for obtaining the respondent's rank order preferences for the stimuli in that second round subset; the step of selecting a second round presentation sequence including the establishment of a set of selection criteria for qualifying a particular stimulus to become a member of a particular second round set based on the rank given to that stimulus by the respondent in the first round;

F) establishing a set of values based on estimated overall rank order preferences for each rank position obtained from the respondent's second round set of rank order preferences;

G) obtaining the respondent's set of rank order preference responses to the first round presentation of the set of S subsets of the N stimuli;

H) obtaining the respondent's set of rank order preferences to the second round presentation sequence consisting of the set of second round subsets of stimuli;

I) associating values for the estimated overall rank order preferences with the stimuli ranked in the second round subsets;

J) associating values for estimating the overall rank order preferences for at least some first-round-only stimuli not presented as members of any of the second round sets by giving an estimated overall rank order preference value to a particular first-round-only stimuli based on the estimated overall rank order preference values give to a high stimulus and a low stimulus where both the high and the low stimuli were presented in second round sets and received estimated overall rank order preference values and both the high and low stimuli were presented in the same first round subset as this particular first-round-only stimuli;

K) repeating step J for each of the first-round-only stimuli to receive estimated overall rank order preference values; and L) outputting the respondent's estimated overall rank order preferences for at least a portion of the set of N stimuli.

19. The method of claim 18 wherein:

some stimuli are not presented as members of the second round subsets; a low ranking first-round-only stimulus not presented as a member of any second round set is given an estimated overall rank order preference value based on the low ranking received from the respondent in the first round.

20. The method of claim 18 wherein the responses from the respondent must pass a consistency test in order for the respondent's estimated overall rank order preferences to be aggregated with a set of estimates of other respondents' rank order preferences as part of an effort to produce an aggregated estimate of the rank order preferences for a set of respondents.

21. The method of claim 18 wherein the responses from the respondent must pass an order bias test in order for the estimate of the respondent's rank order preferences to be aggregated with a set of estimates of other respondents' rank order preferences as part of an effort to produce an aggregated estimate of the rank order preferences for a set of respondents.

22. The method of claim 18 further characterized by:

identifying a factor suitable for testing by monadic testing;

selecting a set of at least two different stimuli instances to be used to measure the relevance of that identified factor to the motivational question;

presenting a first stimulus instance but not a second stimulus instance as part of the N stimuli presented to a first set of respondents;

presenting the second stimulus instance but not the first stimulus instance as part of the N stimuli presented to a second set of respondents; and comparing the aggregated estimated overall rank order preference value of the first stimulus instance by the first set of respondents to the aggregated estimated overall rank order preference value of the second stimulus instance by the second set of respondents to obtain an indication of the sensitivity of respondents to changes in that particular factor from the first stimulus instance to the second stimulus instance.

23. The method of claim 22 wherein the presentation of the first stimulus instance and the second stimulus instance in the first round of subsets is controlled so that these stimuli are always presented in the same relative position within the same first round subset to minimize any impact from order bias.

24. The method of claim 22 where the factor is sales price and the first stimulus instance is a first price and the second stimulus instance is a second price different from the first price so that testing obtains an indication of the sensitivity of the respondents to changes in sales price from the first price to the second price.

25. The method of claim 18 further comprising establishing of a threshold value for screening rank order bias; and aggregating the estimate of respondent's rank order preferences with estimates for other respondents' rank order preferences if the obtained sets of respondent's rank order preferences passes a set of at least one screening test, but not aggregating if a numeric value representing an analysis of the obtained sets of respondent's rank order preferences is on the wrong side of the threshold value.

26. The method of claim 17 wherein the step associating each of the rank order preferences for the presented set of stimuli from set H with a value representative of an estimated overall rank order preference for a stimuli receiving a particular ranking in set H for a set of N stimuli presented in S subsets of R stimuli uses estimated overall rank order preferences derived from Monte Carlo simulations.

27. The method of claim 17 wherein the estimate of the respondent's rank order preferences for at least a portion of N stimuli is to be combined with the estimates of other respondent's rank order preferences for at least a portion of N stimuli, the method further characterized by altering the order of the N stimuli so that the set of respondents are not all presented with the stimuli in the same order in the same S subsets.

28. The method of claim 17 wherein the estimate of the respondent's rank order preferences for at least a portion of N stimuli is to be combined with the estimates of other respondent's rank order preferences for at least a portion of N stimuli, the method further characterized by randomizing the order of the N stimuli for each respondent to so that the first R stimuli presented in the first subset is not consistent across the set of respondents.

29. The method of claim 17 wherein the steps A and B are further characterized by initially presenting R different stimuli to the respondent and then removing each selected choice as an possible choice for subsequent selection until only two choices remain then recording the next selection as the second lowest ranked choice and recording the unselected value as the lowest ranked choice.

30. The method of claim 17 wherein the steps A and B are further characterized by allowing the respondent to indicate that the remaining unselected choices are unimportant and marking the unselected stimuli to indicate that the respondent deemed them unimportant.

31. The method of claim 17 wherein the set of respondent's estimated overall rank order preferences for at least a portion of the set of N stimuli is not aggregated with a set of estimated overall rank order preferences for at last a portion of the set of N stimuli for a second respondent if the second respondent's responses fail a screening test for order bias.

32. The method of claim 31 wherein the screening test for order bias fails the second respondent's responses when the second respondent's rank order preferences for various presented sets of stimuli indicates a correlation between second respondent's sets of rank order preference rank and a relative position of the stimuli within the presented set of stimuli, and the chance of that correlation occurring randomly is less than threshold Y.

* * * * *